(12) United States Patent
Taniguchi et al.

(10) Patent No.: US 11,617,359 B2
(45) Date of Patent: Apr. 4, 2023

(54) REEL SEAT FOR FISHING ROD, FISHING ROD, AND MOVABLE HOOD FOR REEL

(71) Applicant: Shimano Inc., Osaka (JP)

(72) Inventors: Kazuma Taniguchi, Osaka (JP); Yoshiyuki Kaminou, Osaka (JP); Soushi Iwata, Osaka (JP); Takahiro Yamanaka, Osaka (JP)

(73) Assignee: Shimano Inc., Osaka (JP)

( * ) Notice: Subject to any disclaimer, the term of this patent is extended or adjusted under 35 U.S.C. 154(b) by 271 days.

(21) Appl. No.: 16/508,861

(22) Filed: Jul. 11, 2019

(65) Prior Publication Data
US 2020/0037590 A1 Feb. 6, 2020

(30) Foreign Application Priority Data
Jul. 31, 2018 (JP) .............................. JP2018-143134

(51) Int. Cl.
| | | |
|---|---|---|
| A01K 87/06 | (2006.01) | |
| A01K 87/08 | (2006.01) | |
| A01K 97/10 | (2006.01) | |

(52) U.S. Cl.
CPC .............. *A01K 87/06* (2013.01); *A01K 87/08* (2013.01); *A01K 97/10* (2013.01)

(58) Field of Classification Search
CPC ......... A01K 87/00; A01K 87/06; A01K 87/08
USPC .......................................................... 43/22
See application file for complete search history.

(56) References Cited

U.S. PATENT DOCUMENTS

| | | | | |
|---|---|---|---|---|
| 4,850,130 A * | 7/1989 | Childre | .................. | A01K 87/08 43/23 |
| 5,291,684 A * | 3/1994 | Oyama | .................. | A01K 87/08 43/22 |
| 5,797,554 A * | 8/1998 | Atherton | ................ | A01K 87/08 242/316 |
| 6,098,333 A * | 8/2000 | Wickizer | ................ | A01K 87/08 43/23 |
| 6,105,302 A * | 8/2000 | Yamamoto | ............. | A01K 87/08 43/23 |
| 6,378,238 B1 * | 4/2002 | Lu | .......................... | A01K 87/06 43/18.1 R |
| 7,159,355 B2 * | 1/2007 | Muroi | .................... | A01K 87/06 43/22 |
| 9,832,981 B2 * | 12/2017 | Omura | ................... | A01K 87/06 |
| 2002/0069574 A1 * | 6/2002 | Ohmura | ................ | A01K 87/08 43/22 |
| 2015/0040463 A1 * | 2/2015 | Lin | ........................ | A01K 87/08 43/22 |

FOREIGN PATENT DOCUMENTS

| | | | | | |
|---|---|---|---|---|---|
| JP | 2010273586 A | * | 12/2010 | ............. | A01K 87/06 |
| JP | 2011-135815 A | | 7/2011 | | |
| WO | WO-2006021981 A1 | * | 3/2006 | ............. | A01K 87/06 |

* cited by examiner

*Primary Examiner* — Brady W Frazier
(74) *Attorney, Agent, or Firm* — Global IP Counselors, LLP

(57) ABSTRACT

A tubular reel seat for fishing rod includes a tubular movable hood and a trigger. The tubular movable hood is disposed on a front side of the reel seat, and includes a hood portion configured to cover a front-end portion of a reel foot of the fishing rod. The trigger is disposed in part of a circumference of an outer circumferential surface of the movable hood on an opposite side of the hood portion, the trigger is configured to be hooked by a finger from the front side.

8 Claims, 28 Drawing Sheets

REEL SEAT FOR FISHING ROD, FISHING ROD, AND MOVABLE HOOD FOR REEL

CROSS-REFERENCE TO RELATED APPLICATIONS

This application claims priority to Japanese Patent Application No. 2018-143134, filed on Jul. 31, 2018. The entire disclosure of Japanese Patent Application No. 2018-143134 is hereby incorporated herein by reference.

BACKGROUND

Field of the Invention

The present invention relates to a reel seat for a fishing rod for fixing a reel to the fishing rod, a fishing rod provided with the reel seat for a fishing rod, and a movable hood used for the reel seat for a fishing rod.

Background Art

As in Japanese Laid-Open Patent Application No. 2011-135815 described below, a reel seat to which a dual-bearing reel is attached can have a trigger on a lower surface. An angler grips a fishing rod by positioning the trigger, for example, between the index and middle fingers. However, fishing for long periods of time tends to tire the hand holding the fishing rod.

SUMMARY

An object of the present invention is to reduce the hand fatigue while holding a fishing rod.

The present invention was made in order to solve the problem described above, and the reel seat for a fishing rod according to the present invention is a tubular reel seat comprising a tubular movable hood on the front side, wherein the movable hood has a hood portion for covering the front-end portion of a reel foot, and the movable hood, in part of the entire circumference of the outer circumferential surface on the opposite side of the hood portion, has a trigger for hooking a finger from the front.

For example, a dual-bearing reel can be attached to a fishing rod on which this reel seat is mounted. The fishing rod can be gripped as shown in FIG. 11, for example. The thumb is positioned on the upper side of the reel. The ball of the thumb presses against the rear portion of the upper surface of the reel or the rear surface of the reel. The fishing rod is positioned between the index finger and the middle finger at a front side position of the reel, the index finger abuts the front surface of the reel, and the middle finger abuts the front surface of the trigger. The ring finger and the little finger abut the lower surface of a reel seat body. Alternatively, when a grip is provided, the ring finger and the little finger can contact the grip. Of the ring finger and the little finger, it is primarily the little finger that contacts the reel seat body and the grip. The ring finger and the little finger are positioned rearwardly, away from the trigger. When gripping in this manner, it possible to support the fishing rod at a total of four points: the ball of the thumb, the index finger, the middle finger, and the little finger. Since the fishing rod can be supported at a total of four points, two on the upper side and two on the lower side of the fishing rod, the fishing rod can be easily stabilized. As a result, it is possible to hold the fishing rod with little force. In addition, by holding the fishing rod in this manner, the wrist tends to be in a straight line with the arm, making bending of the wrist difficult. Therefore, the burden on the wrist is low.

The fishing rod can also be gripped or held as shown in FIG. 13. The thumb is similarly positioned on the upper side of the reel, the ball of the thumb pressing against the rear portion of the upper surface of the reel or the rear surface of the reel. The index finger abuts the front surface of the trigger of the movable hood, and the middle finger, the ring finger, and the little finger abut the lower surface of the reel seat body or the grip. Of the middle finger, the ring finger, and the little finger, it is primarily the little finger that is brought into contact with the reel seat body and the grip. The middle finger, the ring finger, and the little finger are positioned rearwardly, away from the trigger. When gripping in this manner, it possible to support the fishing rod at a total of three points: the ball of the thumb, the index finger, and the little finger. Since the fishing rod can be supported at a total of three points, the fishing rod can be easily stabilized. As a result, it is possible to hold the fishing rod with little force. In this embodiment as well, there is little bending and loading of the wrist.

In addition, since the movable hood has a front-side trigger, when using a large reel, the trigger, together with the movable hood, is positioned relatively forward, and, in when using a small reel, the trigger, together with the movable hood, is positioned relatively rearward. In this manner, since the position of the trigger changes in the longitudinal direction in accordance with the size of the reel, it is possible to grip the fishing rod by a four-point support or a three-point support, as described above, even if the size of the reel is changed.

In particular, the front surface of the trigger is preferably formed to curve convexly toward the front along the width direction, and the rear surface of the trigger is preferably formed to have a recess. As described above, for example, the middle finger abuts the front surface of the trigger. If the middle finger abuts the front surface of the trigger, for example, the first joint of the middle finger is pressed against the front surface of the trigger. At this time, if the front surface of the trigger is formed to curve convexly toward the front along the width direction, the middle finger will make soft contact, making it less likely that the middle finger will hurt. On the other hand, since the ring finger is positioned behind the middle finger, the ring finger does not easily come in contact with the rear surface of the trigger. Thus, even if the rear surface of the trigger has a recess, the ring finger will not hurt. Since the rear surface of the trigger has a recess, the weight of the trigger and of the movable hood can be reduced.

In addition, it is also preferable for the front surface of the trigger to curve convexly toward the front in the width direction and for the amount of rearward projection of the rear surface of the trigger to be less than the amount of forward projection of the front surface, as seen in a horizontal section. Forming the rear surface of the trigger with such a shape also reduces the weight of the trigger. A horizontal section is a cross section along the width direction of the trigger.

In addition, the projecting length of the trigger preferably corresponds to the width of one finger. In the four-point support gripping method described above, it is possible to rotate the handle of the dual-bearing reel with the ring finger by bending and extending the ring finger. In other words, it is possible to rotate the dual-bearing reel while operating the fishing rod with only one hand. When rotating the handle of the dual-bearing reel with the ring finger in such a manner, if the length of the projection of the trigger corresponds to the width of one finger, the ring finger is less likely to interfere with the trigger, and it is possible to smoothly bend and extend the ring finger. Similarly, in the three-point support gripping method described above, it is possible to rotate the handle of the dual-bearing reel by bending and extending the middle finger. In this embodiment as well, the middle finger is less likely to interfere with the trigger, and it is possible to smoothly bend and extend the middle finger.

In addition, the distal end side region of the front surface of the trigger is inclined toward the front with respect to the radial direction of the movable hood at an angle of inclination of 10 degrees or less, and, in a state with the reel attached, the distal end side region of the front surface of the trigger preferably follows the radial direction of the movable hood or is inclined toward the front with respect to the radial direction of the movable hood. With the reel attached, the hood portion of the movable hood rides on the reel foot, and the movable hood tilts commensurate with the amount of play. The inclination is such that, in the region of the entire circumference of the movable hood where the hood portion is located, the front portion of the hood portion approaches the center line of the movable hood and the rear portion moves away from the center line of the movable hood. If the distal end side region of the front surface of the trigger is along the radial direction of the movable hood in the reference state, i.e., before the reel is mounted, then in the mounted state of the reel the distal end side region of the front surface of the trigger will be inclined toward the rear with respect to the radial direction of the movable hood. If the distal end side region of the front surface of the trigger is along the radial direction of the movable hood or is inclined toward the front with respect to the radial direction of the movable hood, in a state in which the distal end side region of the front surface of the trigger is inclined toward the front with respect to the radial direction of the movable hood at an angle of inclination of 10 degrees or less, and the reel is attached, the finger that abuts the trigger will be less likely to slip and will be stable, the four-point support or the three-point support described above creating stability, reducing the load on the hand. In addition, in the reference state, i.e., prior to the mounting of the reel, since the angle of inclination of the distal end side region of the front surface of the trigger is 10 degrees or less, in the mounted state of the reel, even with the distal end side region of the front surface of the trigger inclined toward the front, the angle of inclination will be small. Therefore, a finger can be brought into contact with the front surface of the trigger in a natural state.

In addition, a fishing rod according to the present invention comprises the reel seat described above.

In addition, a movable hood according to the present invention can be a tubular movable hood that has a hood portion for covering the front-end portion of the reel foot, and that, has a trigger disposed, in part of the entire circumference of the outer circumferential surface on the opposite side of the hood portion, for hooking a finger from the front.

As described above, since the movable hood on the front side has a trigger in the portion on the opposite side of the hood portion, it is possible to reduce the fatigue of the hand holding the fishing rod.

DETAILED DESCRIPTION OF THE EMBODIMENTS

First Embodiment

A movable hood, a reel seat for a fishing rod comprising same, and a fishing rod according to a first embodiment of the present invention will be described below with reference to FIGS. 1 to 13. A reel seat 2 according to the present embodiment is for fixing a reel to a fishing rod and is used by attachment to a rod body 1 (blank) of the fishing rod. The reel seat 2 is a so-called pipe seat, which has an overall tubular shape and is externally mounted on the rod body 1 and adhesively fixed in a prescribed position. The reel may be a spinning reel or a dual-bearing reel 3. The reel comprises a reel foot (refer to FIG. 8) that extends in the longitudinal direction. The reel is fixed to the fishing rod by fixing the reel foot to the reel seat 2.

Figure 10:
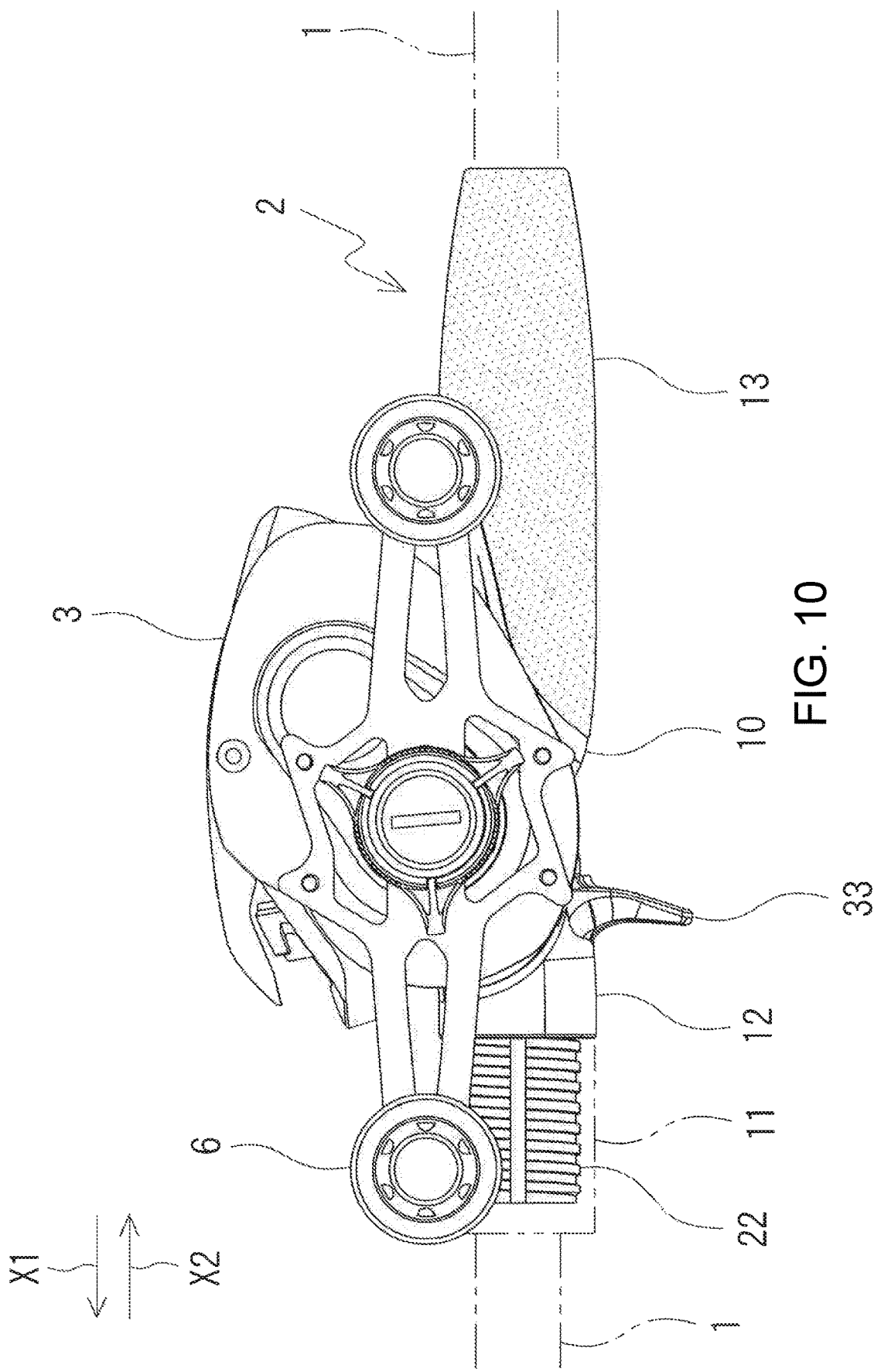
FIG. 10 is a left side view of a state in which a dual-bearing reel is attached to a fishing rod, on which is mounted a reel seat for a fishing rod comprising the movable hood.

In one embodiment, FIG. 10 shows a state in which the dual-bearing reel 3 is attached to the reel seat 2 of the fishing rod. The dual-bearing reel 3 is normally attached to the upper side of the reel seat 2. The rod tip side is referred to as the front side and the rod butt side is referred to as the rear side. The direction of a center line 12a (axial direction) of the movable hood 12, the reel seat 2, and the rod body 1 is the longitudinal direction. In FIG. 10, the front side is indicated by arrow X1, and the rear side is indicated by arrow X2. They are indicated in the same manner in FIG. 4. The direction orthogonal to the longitudinal direction is referred to as the left-right direction. The direction of the rotational axis of a handle 6 of the dual-bearing reel 3 is the left-right direction. The direction of the rotational axis of the handle 6 of a spinning reel is also the left-right direction.

The reel seat 2 has a tubular shape. The reel seat 2 is attached to the outer side of the rod body 1 of the fishing rod. The reel seat 2 comprises a tubular reel seat body 10, a nut 11 indicated by the chain double-dashed line, the movable hood 12, and a grip 13. The grip 13 is positioned immediately behind the reel seat body 10. The grip 13 has a tubular shape and is attached to the rear portion of the reel seat body 10 and to the outer side of the rod body 1. The grip 13 is composed of various types of grip materials. Examples of grip materials include cork and foamed resin such as foamed EVA. In FIG. 10, etc., the grip 13 is shown with a large number of dots. The movable hood 12 is positioned on the front side of the reel foot. That is, the reel seat 2 has a front lock structure.

The reel seat body 10 is adhesively fixed to the outside of the rod body 1 directly or via a tubular spacer (not shown). The reel seat body 10 includes a reel foot attachment portion, not shown, a fixed hood portion 21, and a male threaded portion 22. The reel foot attachment portion can oppose the attachment surface (rear surface) of the reel foot and is disposed on a prescribed part of the entire circumference of the reel seat body 10. The fixed hood portion 21 is disposed at the rear-end portion of the reel foot attachment portion. The fixed hood portion 21 is integrally formed with the reel seat body 10. The reel seat body 10 is formed from a synthetic resin by injection molding. The fixed hood portion 21 covers and holds the rear-end portion of the reel foot, not shown. The fixed hood portion 21 is opened on the front side. The rear-end portion of the reel foot is inserted into the fixed hood portion 21 from the front side.

The male threaded portion 22 is formed on the outer circumferential surface of the front portion of the reel seat body 10. The nut 11 threads onto the male threaded portion 22. The movable hood 12 is positioned on the rear side of the nut 11. The movable hood 12 is movable in the longitudinal direction with respect to the reel seat body 10, but is not rotatable. The movable hood 12 covers and holds a front-end portion 5a of the reel foot (refer to FIG. 8). The movable hood 12 and the fixed hood portion 21 of the reel seat body 10 sandwich the reel foot from the front and back. The reel is thereby fixed to the reel seat 2.

The details of the movable hood 12 will be described. The movable hood 12 according to the present embodiment is shown as a single body in FIGS. 1 to 9C in the separated state. The orientation of the movable hood 12 is arbitrary, but, for the sake of convenience, is shown in FIG. 10 with the dual-bearing reel 3 attached. The movable hood 12 has a tubular shape and covers the outside of the reel seat body 10. Both ends of the movable hood 12 are open.

The movable hood 12 has an annular ridge 30 on the inner circumferential surface of the front-end opening. The annular ridge 30 engages a circumferential engagement groove, not shown, on the outer circumferential surface of the nut 11. As a result, the movable hood 12 does not rotate even if the nut 11 rotates, and the movable hood 12 moves in the longitudinal direction together with the nut 11 as the nut 11 rotates and moves in the longitudinal direction. The movable hood 12 has an engagement ridge 31 at an intermediate portion of the inner circumferential surface. The engagement ridge 31 extends in a straight line along the longitudinal direction. The position and number of the engagement ridges 31 are arbitrary, but, in the present embodiment, a pair of the engagement ridges 31 are provided opposing each other above and below. However, a pair of the engagement ridges 31 may also oppose each other in the left-right direction. The engagement ridges 31 engage guide grooves, not shown, formed on the outer circumferential surface of the reel seat body 10. By the engagement of the engagement ridges 31 with the guide grooves of the reel seat body 10, the movable hood 12 can move linearly in the longitudinal direction while being guided by the guide grooves without rotating about the center line of the reel seat 2.

The movable hood 12 has a hood portion 32 at the opening edge portion of the rear-end opening. The hood portion 32 has a shape in which part of the entire circumference of the opening edge portion of the rear-end opening of the movable hood 12 projects radially outward. The hood portion 32 is opened on the rear side. The front-end portion 5a of the reel foot enters the hood portion 32 from the rear. The hood portion 32 covers the front-end portion 5a of the reel foot from the radially outward side and holds the front-end portion 5a of the reel foot. The hood portion 32 of the movable hood 12 and the fixed hood portion 21 of the reel seat body 10 sandwich the reel foot from the front and back.

The movable hood 12 has a trigger 33 on the outer circumferential surface. The trigger 33 is positioned in part of the entire circumference of the outer circumferential surface of the movable hood 12, on the vertically opposite side of the hood portion 32. The longitudinal positions of the hood portion 32 and the trigger 33 are substantially the same. For example, when the hood portion 32 is positioned at the upper side portion of the outer circumferential surface, the trigger 33 is positioned at the lower side portion of the outer circumferential surface. The trigger 33 and the hood portion 32 are in a positional relationship opposite to each other by 180 degrees when the movable hood 12 is viewed from the front side or when the movable hood 12 is viewed from the rear side. Meanwhile, the longitudinal position of the trigger 33 is arbitrary. In the present embodiment, the trigger 33 is positioned in the vicinity of the rear-end portion of the outer circumferential surface of the movable hood 12, but may be positioned in the vicinity of the front-end portion, or in an intermediate portion of the outer circumferential surface of the movable hood 12 in the longitudinal direction.

Figure 1:
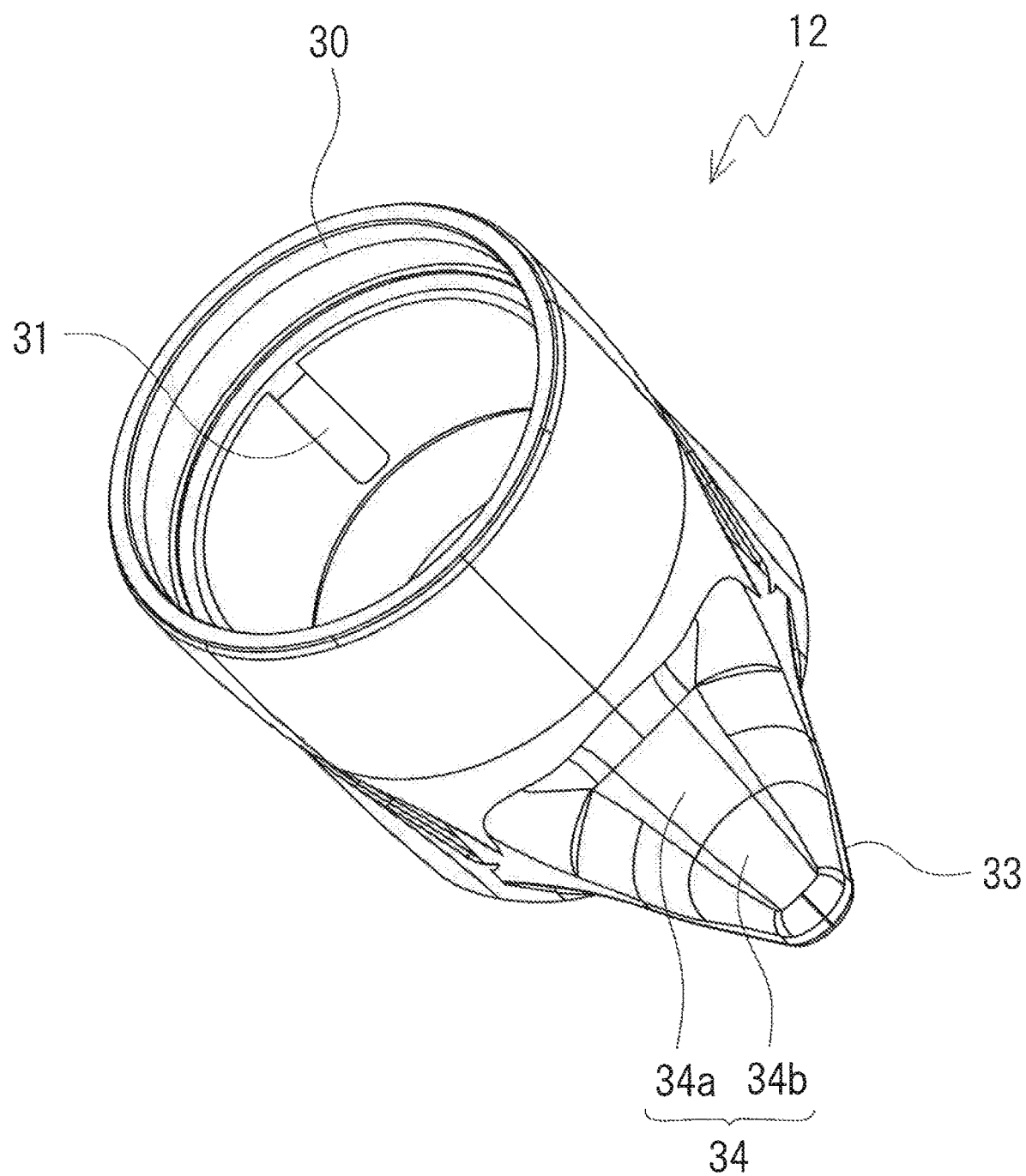
FIG. 1 is a perspective view of a movable hood in a first embodiment of the present invention as seen from the front.
Figure 2:
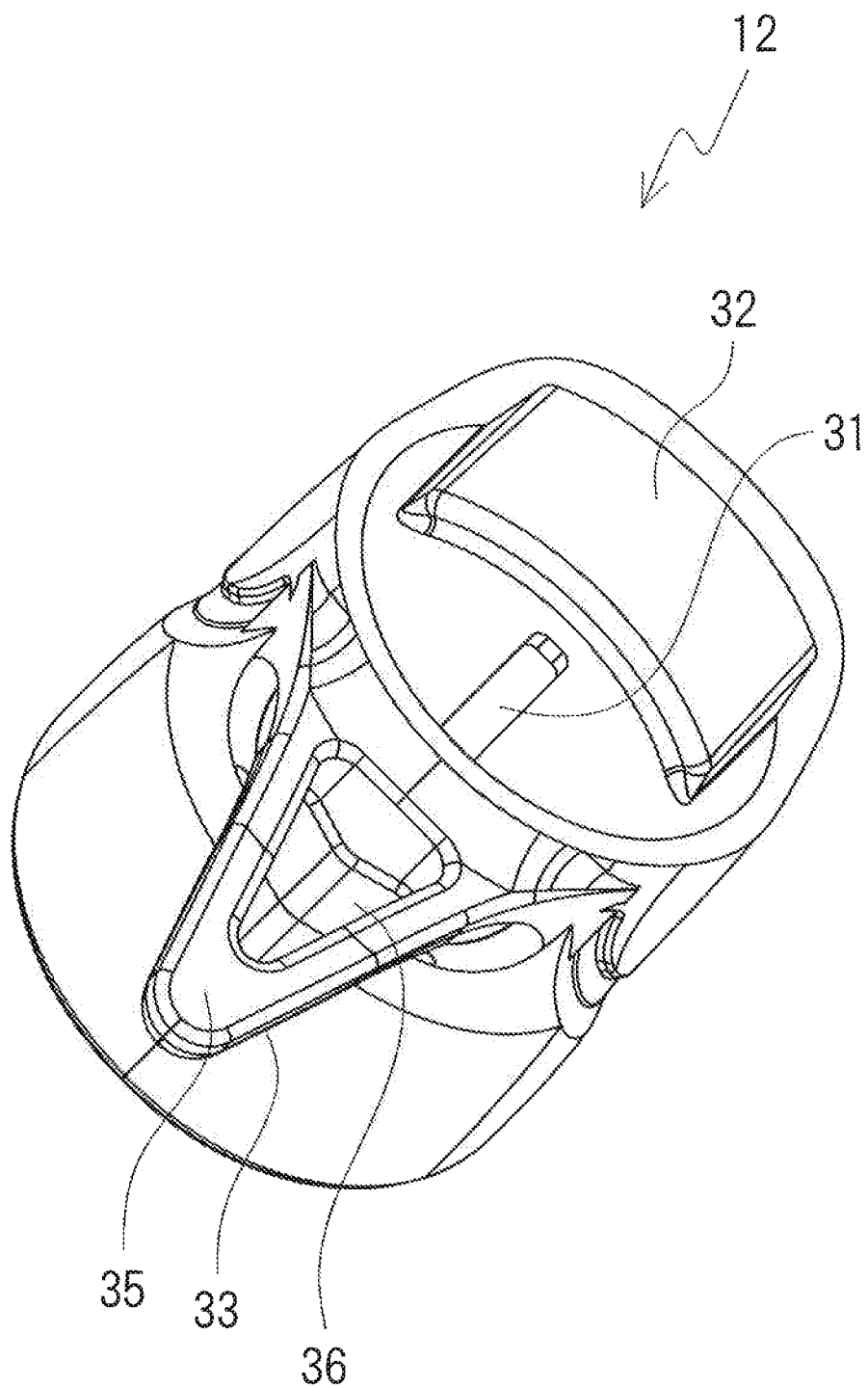
FIG. 2 is a perspective view of the movable hood as seen from the rear.
Figure 3:
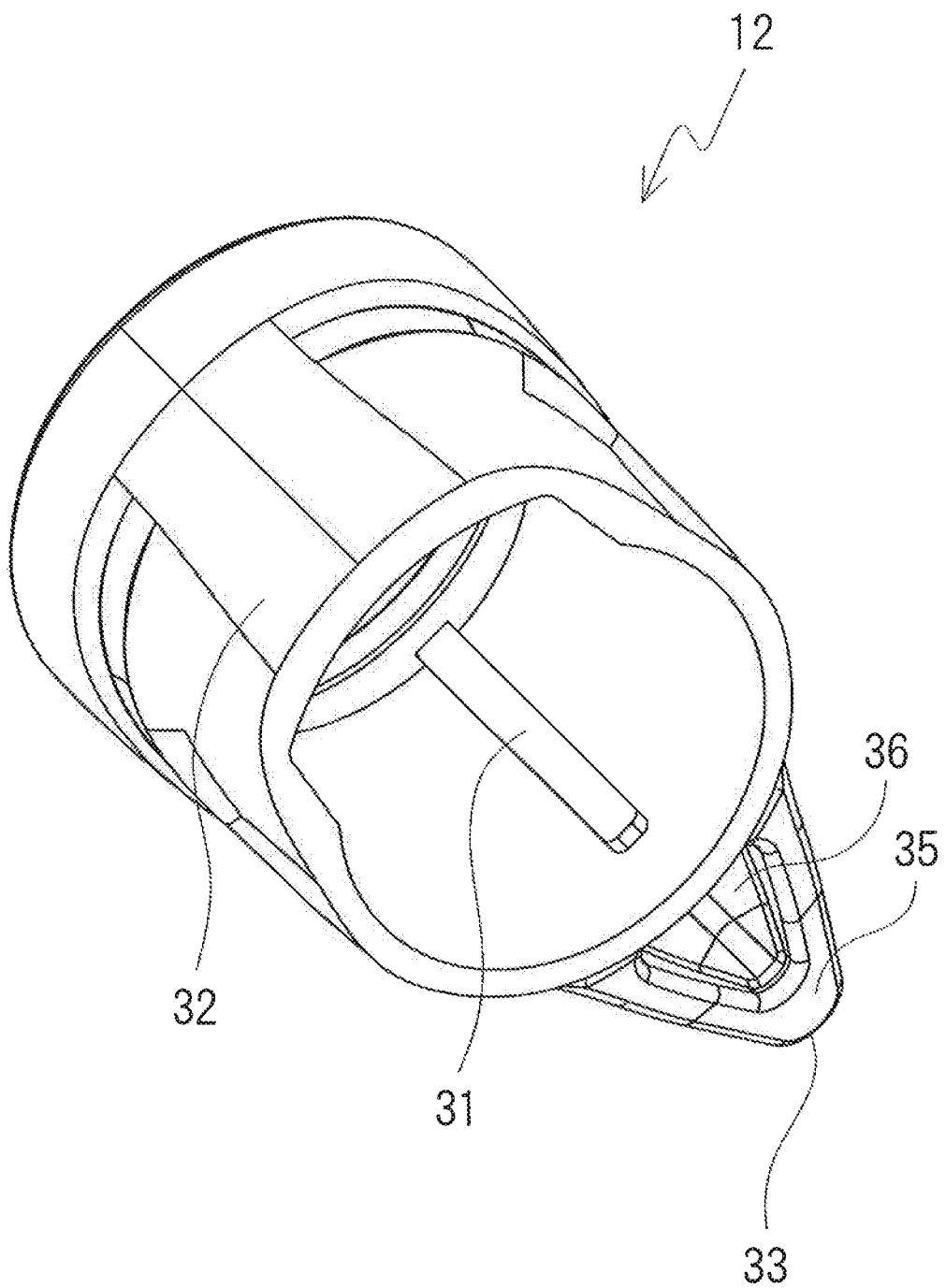
FIG. 3 is a perspective view of the movable hood as seen from the rear.
Figure 4:
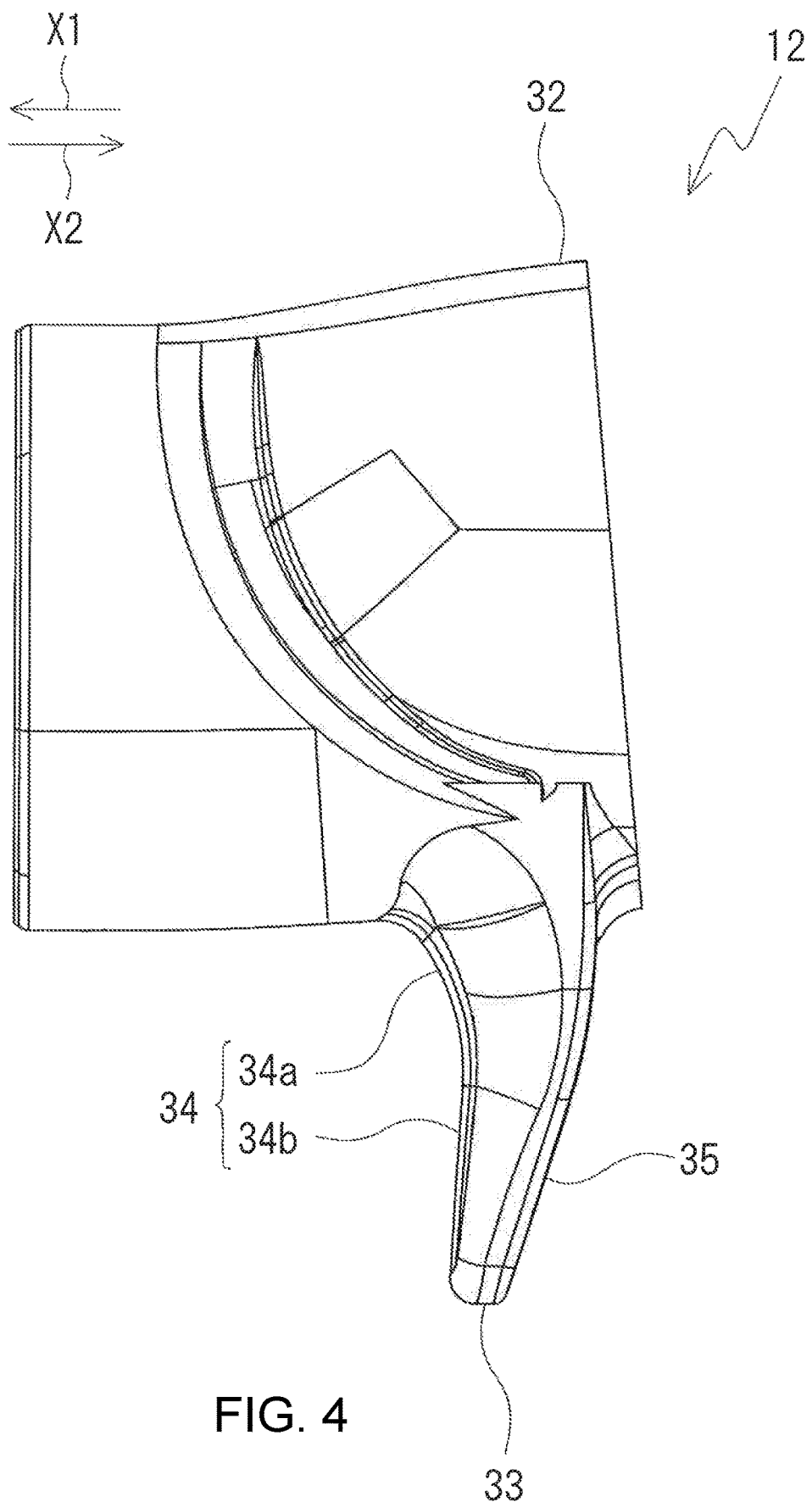
FIG. 4 is a left side view of the movable hood.
Figure 5:
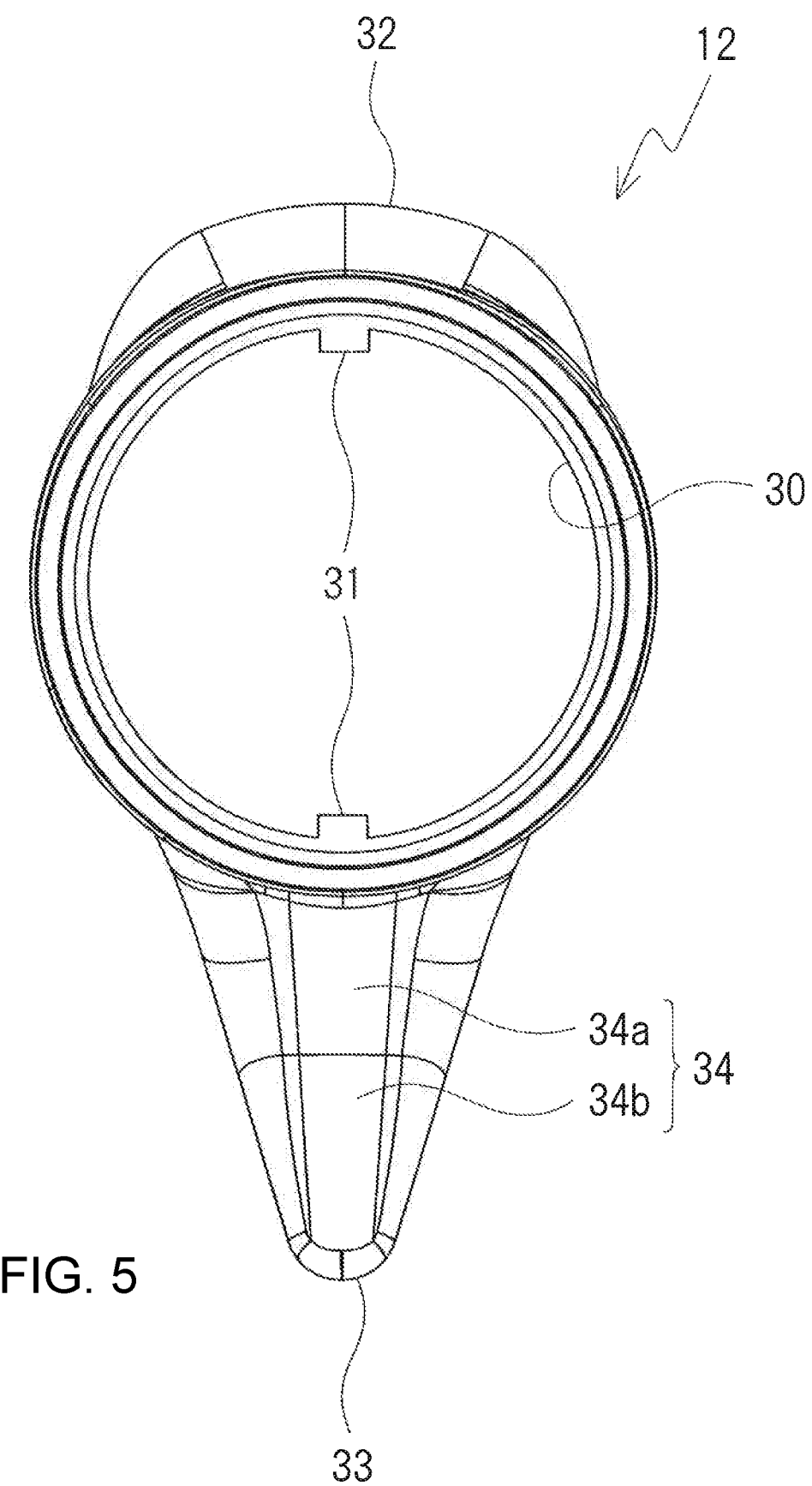
FIG. 5 is a front view of the movable hood as seen in the direction of the center line.
Figure 6:
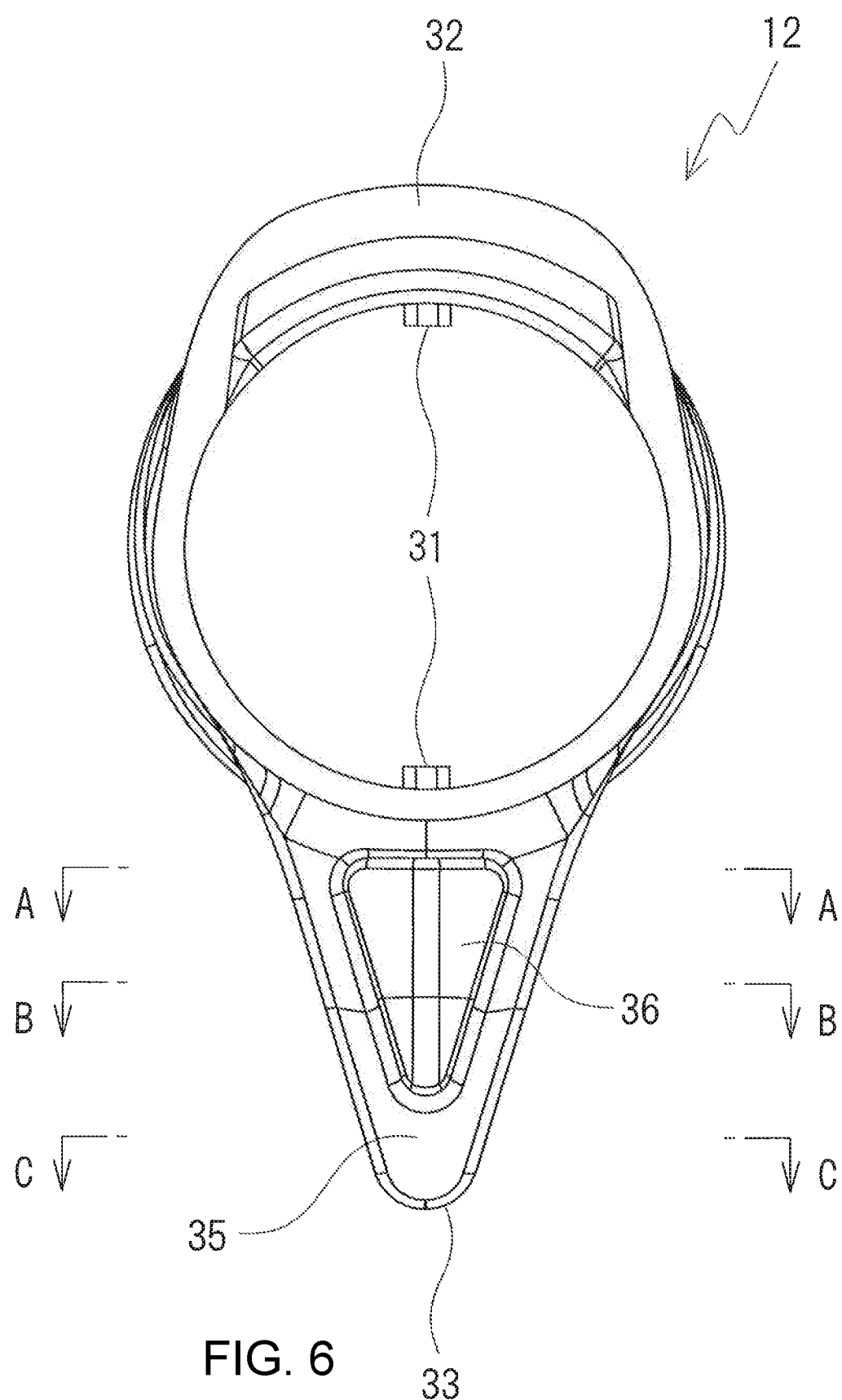
FIG. 6 is a rear view of the movable hood as seen in the direction of the center line.
Figure 7:
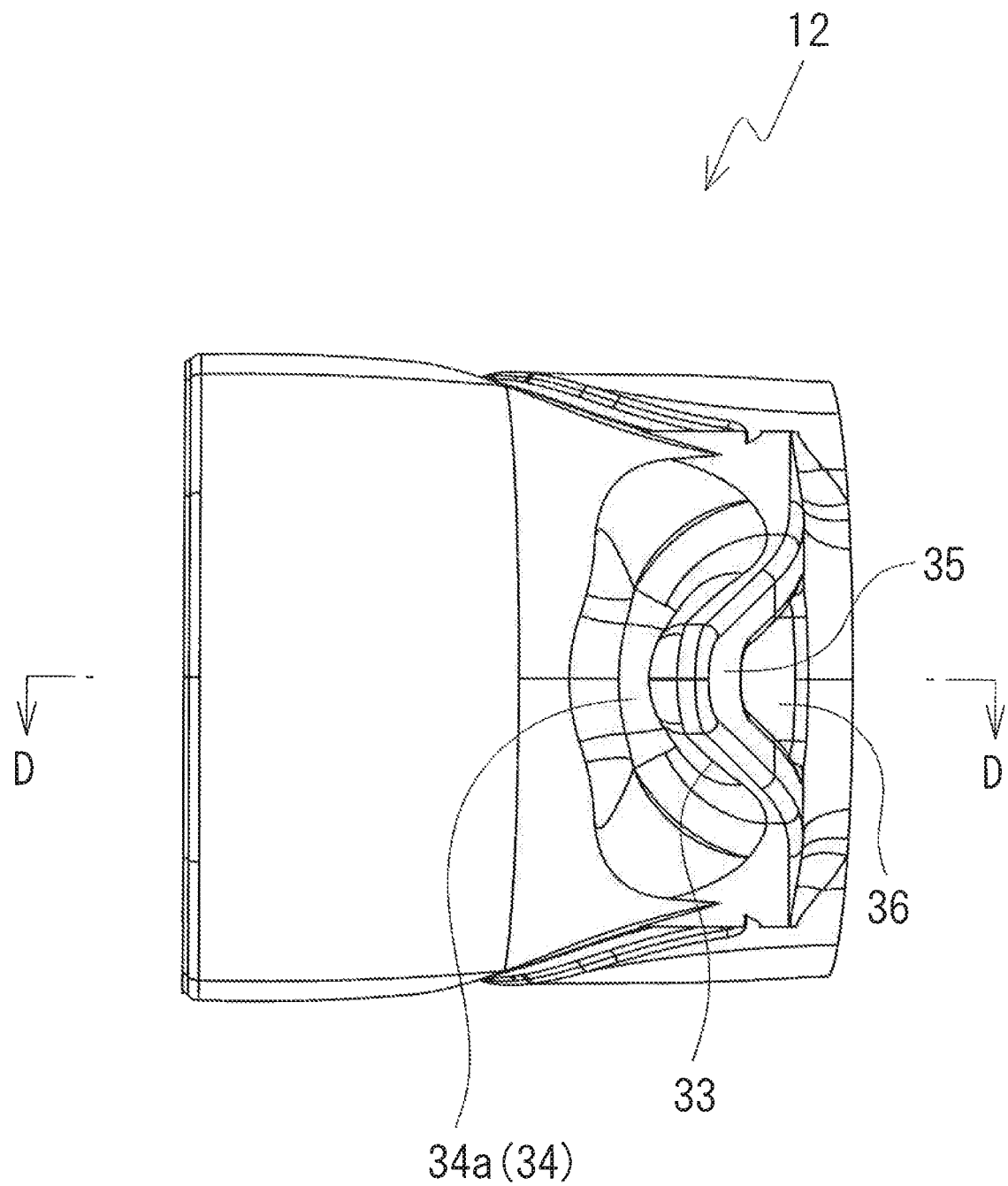
FIG. 7 is a bottom view of the movable hood as seen from the lower side.
Figure 8:
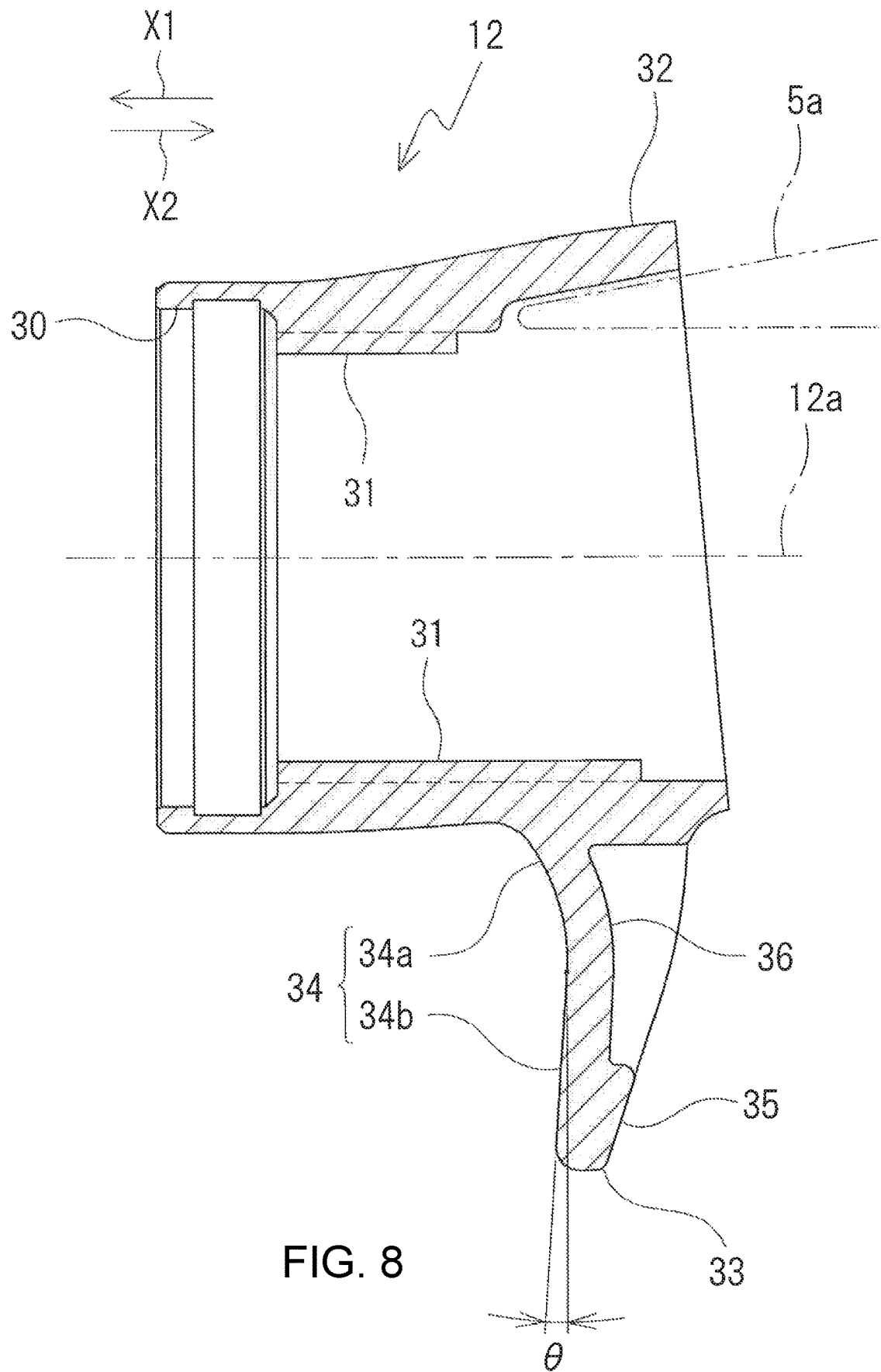
FIG. 8 is a cross-sectional view taken along line D-D in FIG. 7.

The trigger 33 projects essentially radially outward from the outer circumferential surface of the movable hood 12. As shown in FIGS. 4 and 8, the longitudinal dimension of the trigger 33 is the thickness of the trigger 33. The thickness of the trigger 33 is large at the proximal end portion and small at the distal end portion. The thickness of the trigger 33 gradually decreases from the proximal end portion to the distal end portion. As shown in FIGS. 5 and 6, the dimension of the trigger 33 in the left-right direction is the width of the trigger 33. The width of the trigger 33 is large at the proximal end and small at the distal end. The width of the trigger 33 gradually decreases from the proximal end to the distal end. The shape of the trigger 33 appears essentially triangular, seen from the front as well as from the rear, i.e., in both a front view of the trigger 33 and a back view of the trigger 33, with the proximal end forming the base and the distal end forming the apex; specifically, the shape is a laterally symmetrical isosceles triangle with an acute vertex.

A finger can be hooked on a front surface 34 of the trigger 33. Generally, the finger can be the index finger or the middle finger. The finger can be hooked around the trigger 33 in the left-right direction. The finger can be hooked around the trigger 33 from right to left in the case of the right hand, and from left to right in the case of the left hand. The projecting length of the trigger 33 is a length corresponding to the width of one index finger or middle finger of an average adult hand.

Figure 9A:
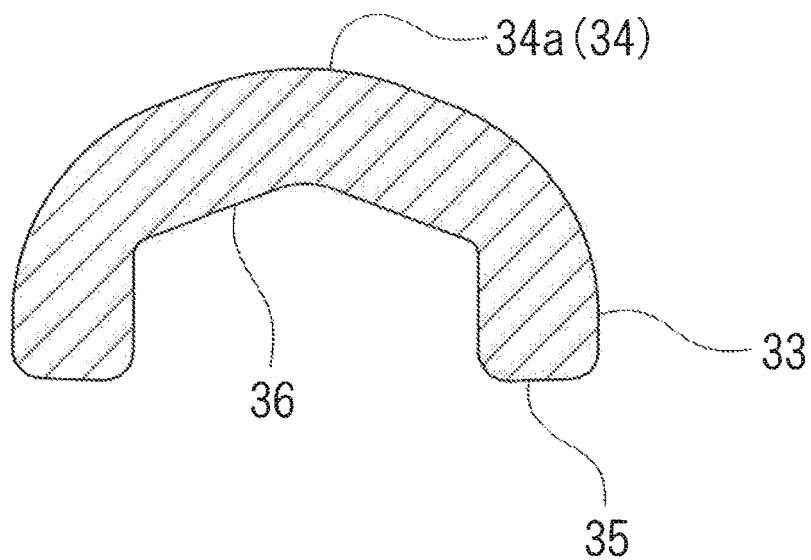
FIGS. 9A to 9C are cross-sectional views taken along lines A-A, B-B, and C-C of FIG. 6, respectively.
Figure 9B:
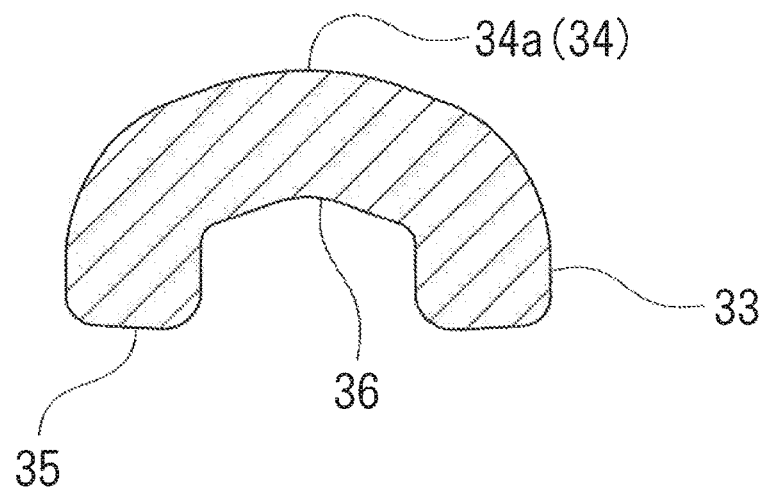
Figure 9C:
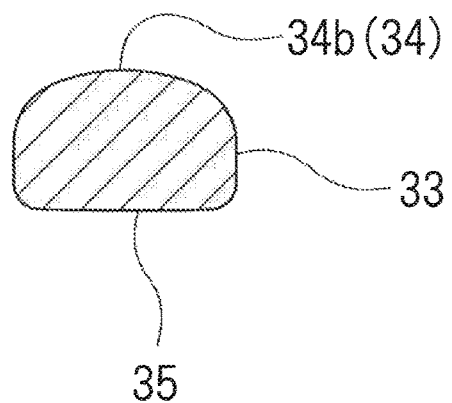

As shown in FIGS. 9A-9C, the front surface 34 of the trigger 33 is curved convexly toward the front in the left-right direction. The front surface 34 of the trigger 33 is a curved surface that projects toward the front in the left-right direction. The left and right edges of the front surface 34 of the trigger 33 preferably extend to the vicinity of the rear surface 35 of the trigger 33. The left and right edges of the front surface 34 of the trigger 33 preferably extend to the rear side, at least beyond the central portion of the trigger 33 in the longitudinal direction. That is, the left and right edges of the front surface 34 of the trigger 33 preferably extend to the rear portion of the trigger 33.

There is very little bulging of the rear surface 35 of the trigger 33 toward the rear. The rear surface 35 of the trigger 33 has a recess 36. The recess 36 is recessed toward the front side. The shape, size, and number of the recesses 36 are arbitrary, but in the present embodiment, the recess 36 is disposed in one location in the central portion of the rear surface 35 of the trigger 33. As shown in FIG. 6, the recess 36 corresponds to the shape of the trigger 33. The width of the recess 36 is wide at the proximal end side of the trigger 33 and narrow at the distal end side of the trigger 33. The width of the recess 36 gradually increases from the proximal end side to the distal end side of the trigger 33. Specifically, the recess 36 has an essentially triangular shape corresponding to the shape of the trigger 33 in a front view or a back view. The depth of the recess 36 is approximately half the thickness of the trigger 33. Since the rear surface 35 of the trigger 33 has the recess 36, the wall thickness of the trigger 33 is essentially constant.

As shown in FIGS. 6 and 8, overall, the trigger 33 extends at an inclination toward the front. In the longitudinal cross-sectional view shown in FIG. 8, the front surface 34 of the trigger 33 is divided into two parts, a proximal end side region 34a and a distal end side region 34b. The proximal end side region 34a and the distal end side region 34b differ in shape. The ratio of the proximal end side region 34a to the distal end side region 34b may vary, but in the present embodiment, the proximal end side region 34a and the distal end side region 34b divide the front surface 34 of the trigger 33 in two. Thus, the proximal end side region 34a occupies essentially half of the area on the proximal end side, and the distal end side region 34b occupies essentially half of the area on the distal end side. In a longitudinal cross-sectional view, the proximal end side region 34a of the front surface 34 of the trigger 33 curves convexly toward the rear. The proximal end side region 34a of the front surface 34 of the trigger 33 curves rearwardly and extends from the proximal end side to the distal end side. In a longitudinal cross-sectional view, the distal end side region 34b of the front surface 34 of the trigger 33 is a straight line that is inclined forward with respect to the radial direction of the movable hood 12 at an angle of inclination θ.

The radial direction of the movable hood 12 at the position of the trigger 33 is indicated by the dashed line in FIG. 8. The radial direction of the movable hood 12 indicated by the dashed line is the vertical direction. The distal end side region 34b of the front surface 34 of the trigger 33 is inclined forward with respect to the vertical direction at an angle of inclination θ, so as to be positioned farther to the front side toward the distal end side. The angle of inclination θ is preferably 10 degrees or less, and more preferably 5 degrees or less. In addition, the angle of inclination θ is preferably 1 degree or more. The movable hood 12 is mounted on the reel seat body 10 so as to be movable in the longitudinal direction. There can be a gap between the outer circumferential surface of the reel seat body 10 and the inner circumferential surface of the movable hood 12. Due to the gap and the play, when a reel is attached to the reel seat 2, the movable hood 12 can be slightly inclined. The inclination is such that the front side of the center line 12a of the movable hood 12 becomes the trigger 33 side, and the rear side of the center line 12a of the movable hood 12 becomes the hood portion 32 side. For example, if the hood portion 32 is positioned above the movable hood 12 and the trigger 33 is positioned below the movable hood 12, the inclination of the movable hood 12 is such that the front side of the center line 12a of the movable hood 12 is the lower side, and the rear side of the center line 12a of the movable hood 12 is the upper side.

When, due to the attachment of the reel to the reel seat 2, the movable hood 12 is slightly inclined, it is preferable that the distal end side region 34b of the front surface 34 of the trigger 33 have no rearward inclination. That is, when the reel is attached to the reel seat 2, the distal end side region 34b of the front surface 34 of the trigger 33 preferably either follows the vertical direction or is inclined slightly forward with respect to the vertical direction. When the reel is attached to the reel seat 2, the distal end side region 34b of the front surface 34 of the trigger 33 extends in the vertical direction, the distal end side region 34b of the front surface 34 of the trigger 33 has an attitude that is orthogonal to the center line 12a of the movable hood 12. When the reel is attached to the reel seat 2, the distal end side region 34b of the front surface 34 of the trigger 33 can be inclined slightly forward, the angle preferably a few degrees or less, and more preferably 5 degrees or less. For example, when the angle of inclination θ of the distal end side region 34b of the front surface 34 of the trigger 33 is 5 degrees and the movable hood 12 is inclined by 2 degrees by attaching the reel, the distal end side region 34b of the front surface 34 of the trigger 33 when the reel is attached is inclined forward by 5−2=3 degrees.

The movable hood 12 is preferably a single member. The trigger 33 is preferably integrally formed with the movable hood 12. The movable hood 12 is preferably formed from a synthetic resin by injection molding.

For example, the dual-bearing reel 3 is mounted on the reel seat 2, as described above. As shown in FIG. 10, the dual-bearing reel 3 is positioned above the reel seat 2 in a normal use state. The dual-bearing reel 3 can be a right-handle type or a left-handle type. The left-handle type is shown as an example in the drawing. In the embodiment of a left-handle dual-bearing reel 3, the fishing rod is gripped with the right hand, and the handle 6 is rotated with the left hand.

Figure 11:
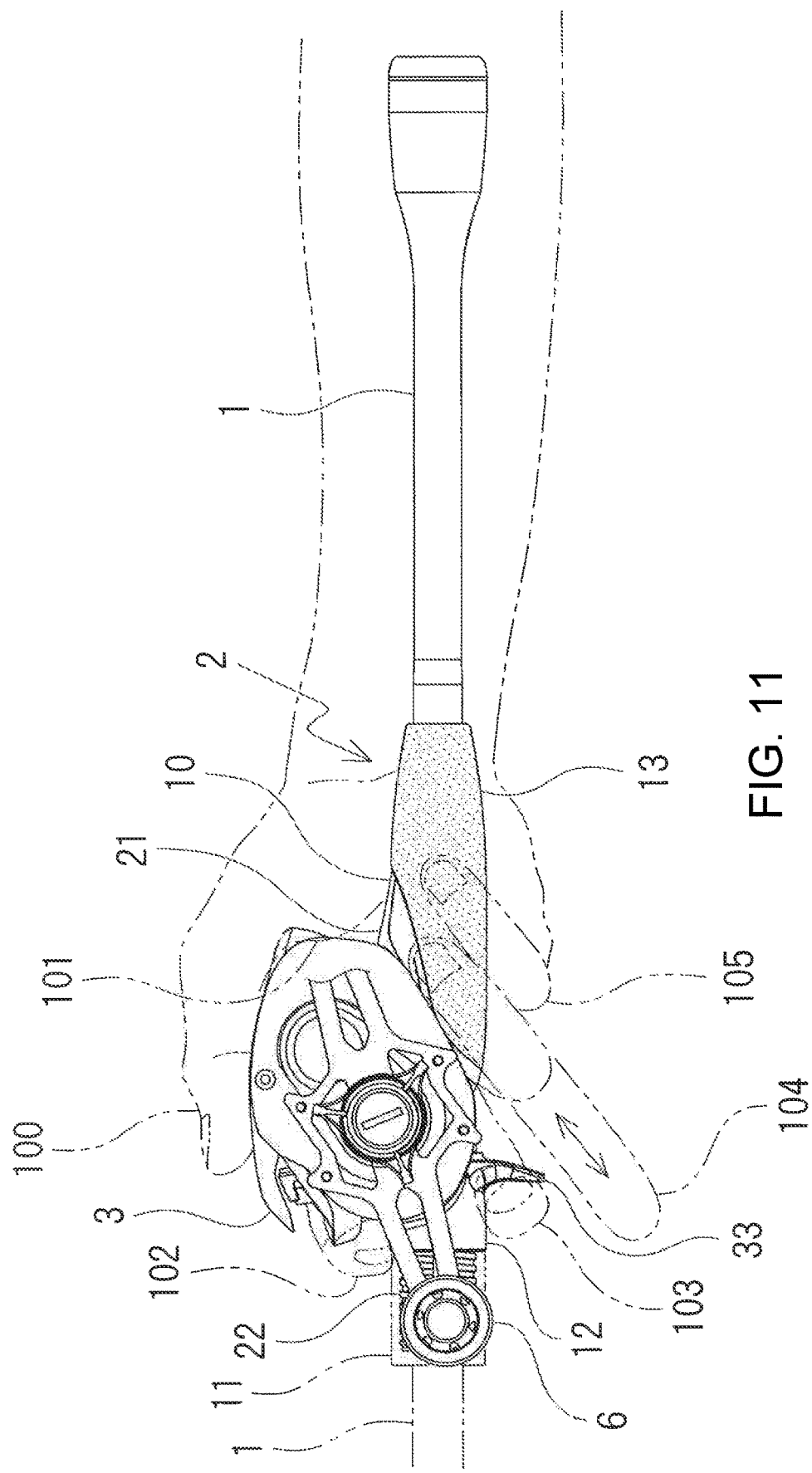
FIG. 11 is a side view showing one example of a state in which the fishing rod of FIG. 10 is gripped.

When the fishing rod is held with the right hand, for example, it can be held as shown in FIG. 11. In FIG. 11, the right hand is indicated by the chain double-dashed line. This type of grip is, for example, suitable for boat fishing. A thumb 100 can be positioned on the upper side of the dual-bearing reel 3. The thumb 100 can be in contact with the upper surface of the dual-bearing reel 3 or can be slightly suspended above the upper surface of the dual-bearing reel 3. The ball of the thumb 101 can press against the rear portion of the upper surface of the dual-bearing reel 3 or the rear surface of the dual-bearing reel 3. The ball of the thumb 101 generally is the first support point for supporting the fishing rod. The dual-bearing reel 3 can pushed forward and obliquely downward with the ball of the thumb 101.

Generally, the fishing rod can be positioned between the index finger 102 and the middle finger 103 at the front side position of the dual-bearing reel 3. When used in this manner, the fishing rod passes between the index finger 102 and the middle finger 103, and the index finger 102 is positioned above the fishing rod. The index finger 102 can abut the front surface of the dual-bearing reel 3. Since the dual-bearing reel 3 is on the upper side of the fishing rod, the index finger 102 can be hooked onto the dual-bearing reel 3 from the front. The index finger 102 thereby becomes the second support point for supporting the fishing rod. The dual-bearing reel 3 can be pulled rearward, i.e., pulled back with the index finger 102.

Figure 12:
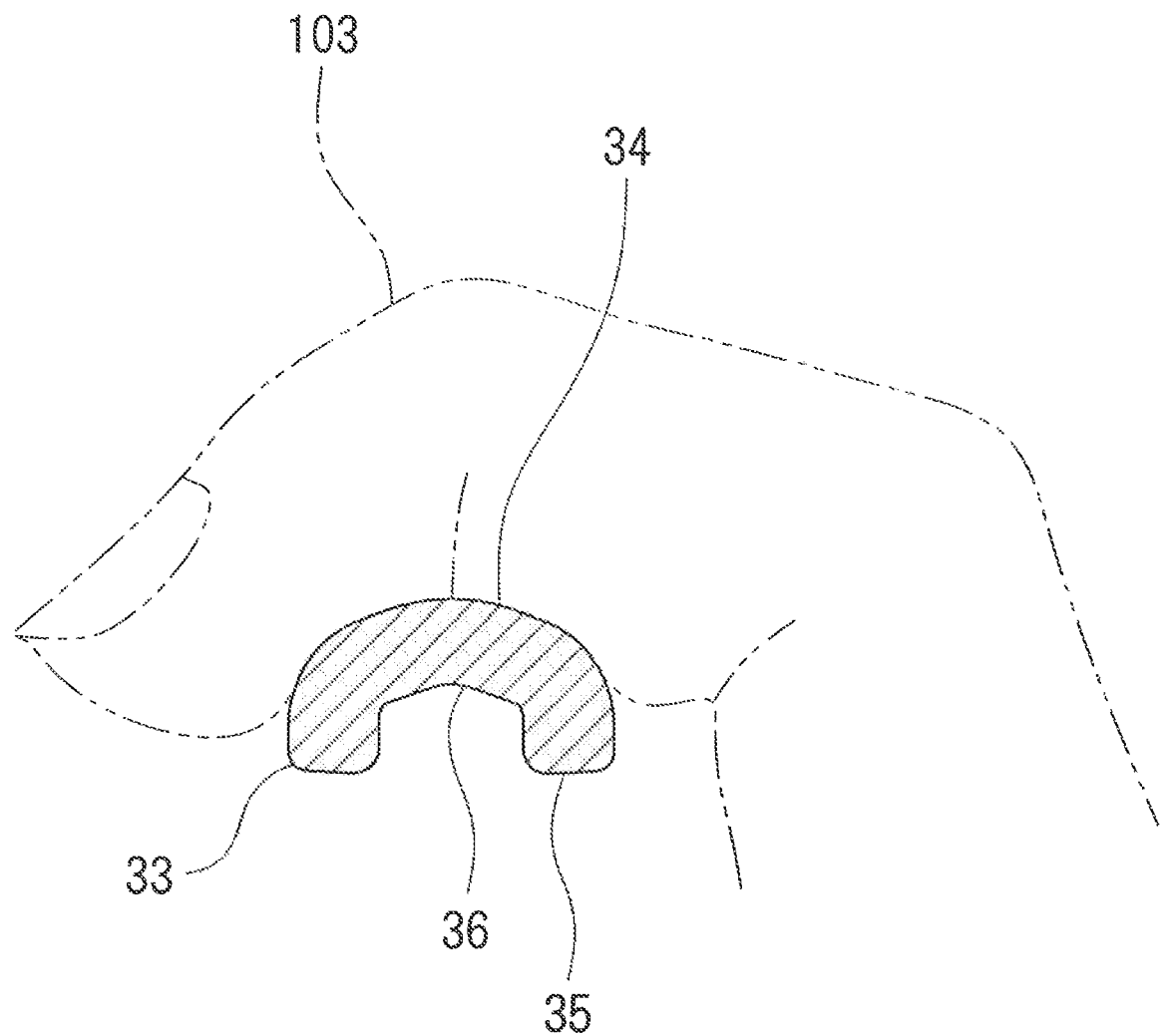
FIG. 12 is a cross-sectional view corresponding to FIG. 9B showing the trigger of the fishing rod of FIG. 10.

Further, the middle finger 103 can be positioned below the fishing rod. The middle finger 103 is then hooked on the trigger 33 of the movable hood 12. The middle finger 103 can be positioned essentially directly below or slightly behind the index finger 102, across the fishing rod. This type of relationship between the middle finger 103 and the trigger 33 is illustrated in FIG. 12. The middle finger 103 can abut the front surface 34 of the trigger 33, but does not abut the rear surface 35 of the trigger 33 and only abuts the front surface 34 of the trigger 33. The abutting state of the middle finger 103 with the front surface 34 of the trigger 33 can vary. For example, only the finger pad of the finger tip of the middle finger 103 can abut the front surface 34 of the trigger 33. Preferably, as shown in FIG. 12, the first joint of the middle finger 103 can be positioned in the central portion of the front surface 34 of the trigger 33 in the left-right direction, and the finger pad portions on both sides of the first joint are respectively brought into close contact with the left portion and the right portion of the front surface 34 of the trigger 33. Since the projecting length of the trigger 33 is a length corresponding to the width of the middle finger 103, the entire width of the middle finger 103 can be pressed against the front surface 34 of the trigger 33. In addition, the trigger 33 projects only slightly downward with respect to the middle finger 103. The middle finger 103 thus becomes the third support point for supporting the fishing rod. The trigger 33 is pulled forward with the middle finger 103.

The remaining two fingers, the ring finger 104 and the little finger 105, can abut the lower surface of the grip 13. The ring finger 104 and the little finger 105 are positioned away from the trigger 33 on the rear side. Of the ring finger 104 and the little finger 105, it is primarily the little finger 105 that grips the grip 13. It is sufficient if the ring finger 104 is placed only lightly on the grip 13. The little finger 105 thus becomes the fourth support point for supporting the fishing rod. The little finger 105 can push the rod upward.

When the fishing rod is held in this manner, it is possible to support the fishing rod at four points: the ball of the thumb 101, the index finger 102, the middle finger 103, and the little finger 105. That is, support can be accomplished at a total of four points: two points above and below the front portion of the dual-bearing reel 3, and two points above and below the rear portion of the dual-bearing reel 3. Moreover, support can be accomplished at a total of four points: two points front and back of the upper side of the fishing rod, and two points front and back of the lower side of the fishing rod. Therefore, the fishing rod can be easily stabilized. Since the dual-bearing reel 3 is positioned on the upper side of the fishing rod, the weight of the dual-bearing reel 3 can have a tendency to rotate the fishing rod to the left and right. When the handle 6 is rotated with the left hand as well, the fishing rod tends to shake to left and right as the handle 6 is rotated. However, by the four-point support discussed herein, it is possible to easily suppress left-right rotation and shaking of the fishing rod. In addition, it is possible to grip the fishing rod with little force, so that there is little burden on the angler. In addition, as shown in FIG. 11, it is possible to hold the fishing rod with the palm of the hand extending directly forward with respect to the arm, so that the palm of the hand and the arm are in a straight line. That is, bending of the wrist is reduced or eliminated. In other words, gripping and holding the fishing rod can be accomplished with the hand directly extended. Therefore, there is little load on the wrist, and fishing for long periods of time while comfortably holding the fishing rod is possible. Moreover, since the fishing rod is on the same line as the palm of the hand and the arm, the sense of unity between the fishing rod and the hand is enhanced, so that the fishing rod can become an extension of the hand.

In addition, as indicated by the arrow in FIG. 11, it is possible to rotate the handle 6 with the ring finger 104 by extending and bending the ring finger 104. For example, when fishing for filefish, there are situations in which the fishing rod is shaken up and down to carry out a so-called "whip fishing" operation. In such a situation, the fishing rod is vibrated slightly up and down with only the one hand holding the fishing rod, the right hand, as shown in FIG. 11. At this time, while the line is slack, or the like, it is possible to eliminate the slack in the line by rotating the handle 6 with the ring finger 104. In other words, it is possible to carry out a rod action and a rotation operation of the handle 6 with only one hand. Since the ring finger 104 does not interfere with the trigger 33, when the handle 6 is rotated with the ring finger 104 in this manner, the handle 6 can be smoothly rotated with the ring finger 104. In addition, since the fishing rod is supported at four points, the fishing rod will be stable even when the ring finger 104 is extended and bent, and the handle 6 can be easily rotated.

Figure 13:
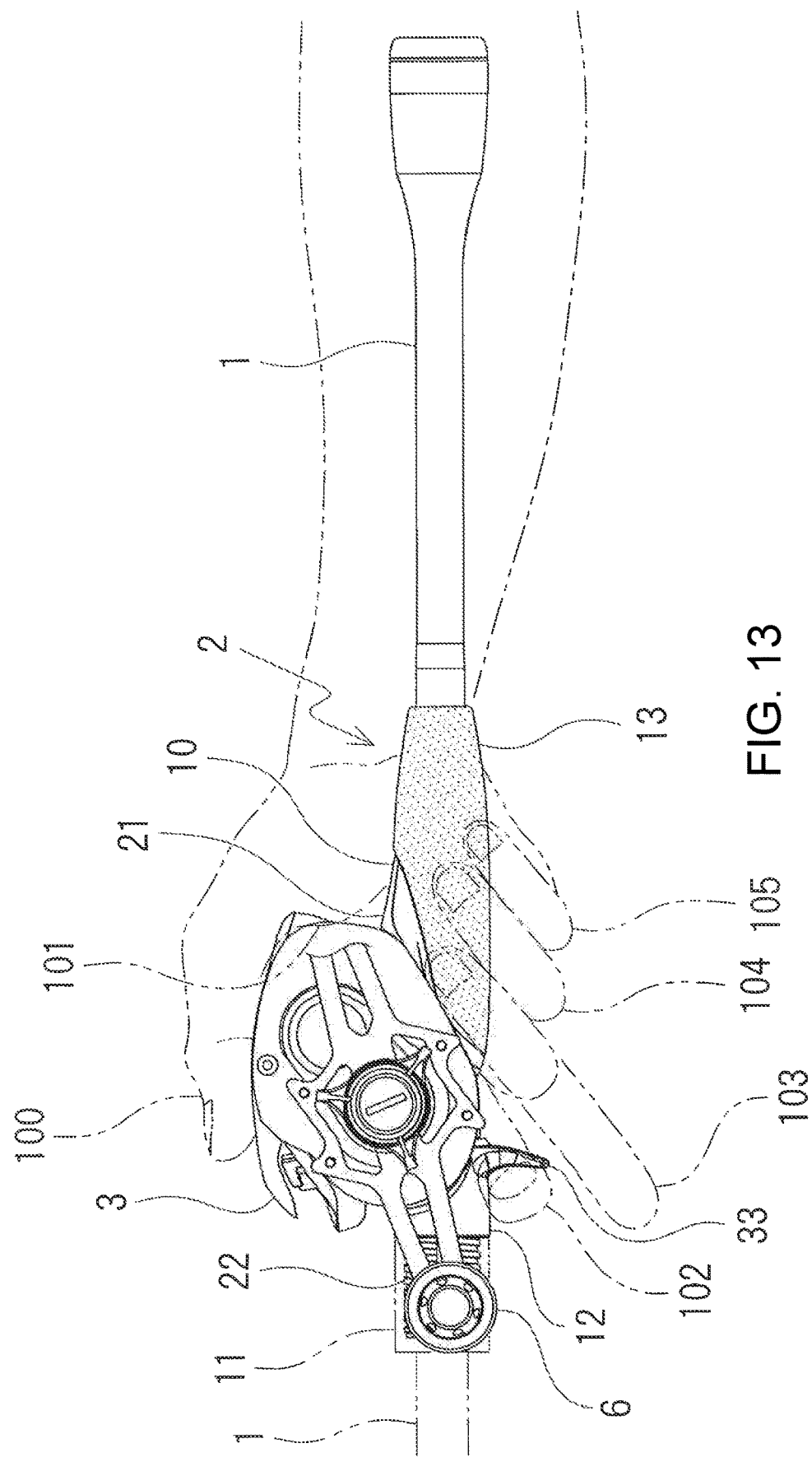
FIG. 13 is a side view showing one example of a state in which the fishing rod of FIG. 10 is gripped.
Figure 14:
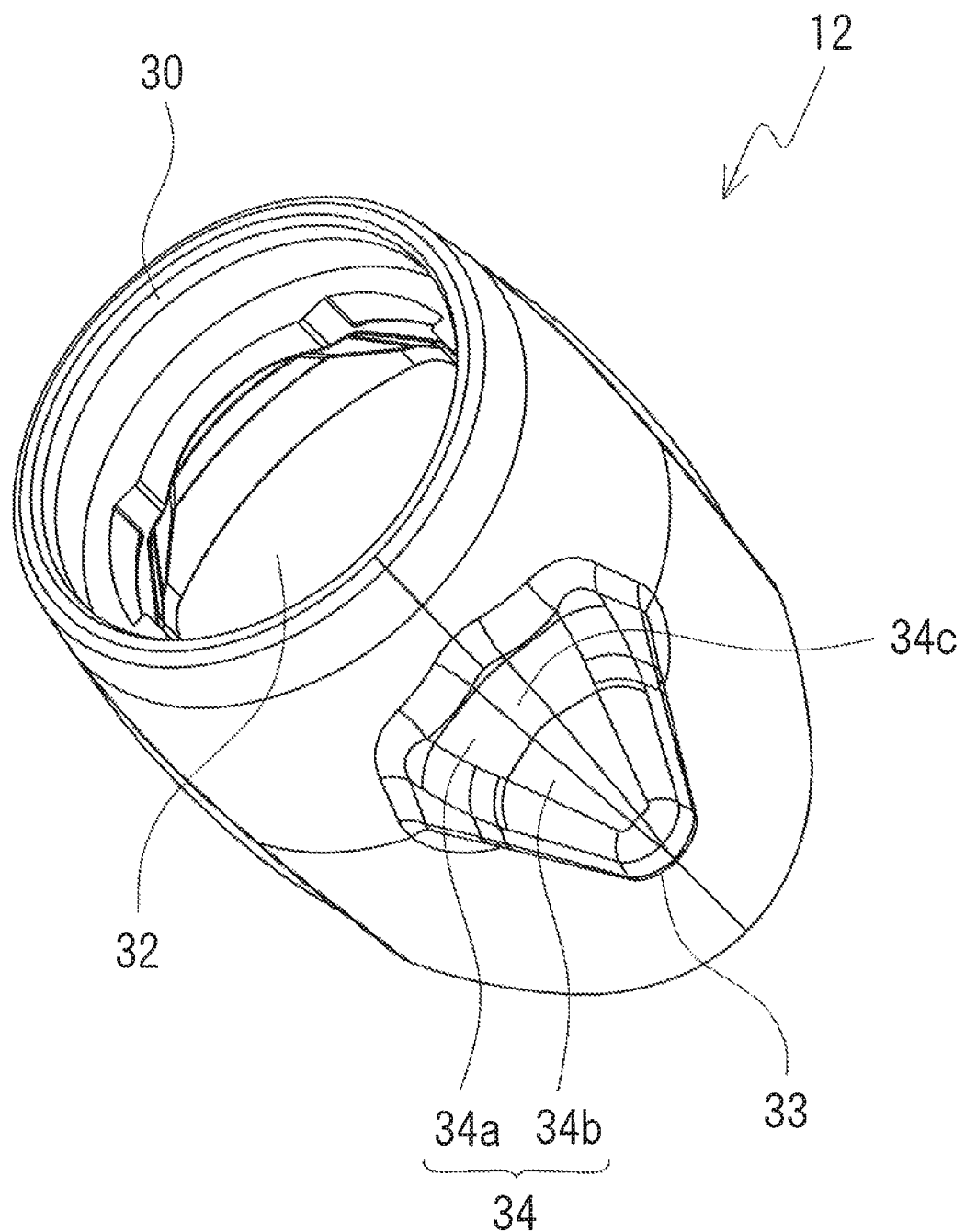
FIG. 14 is a perspective view of the movable hood in a second embodiment of the present invention as seen from the front.
Figure 15:
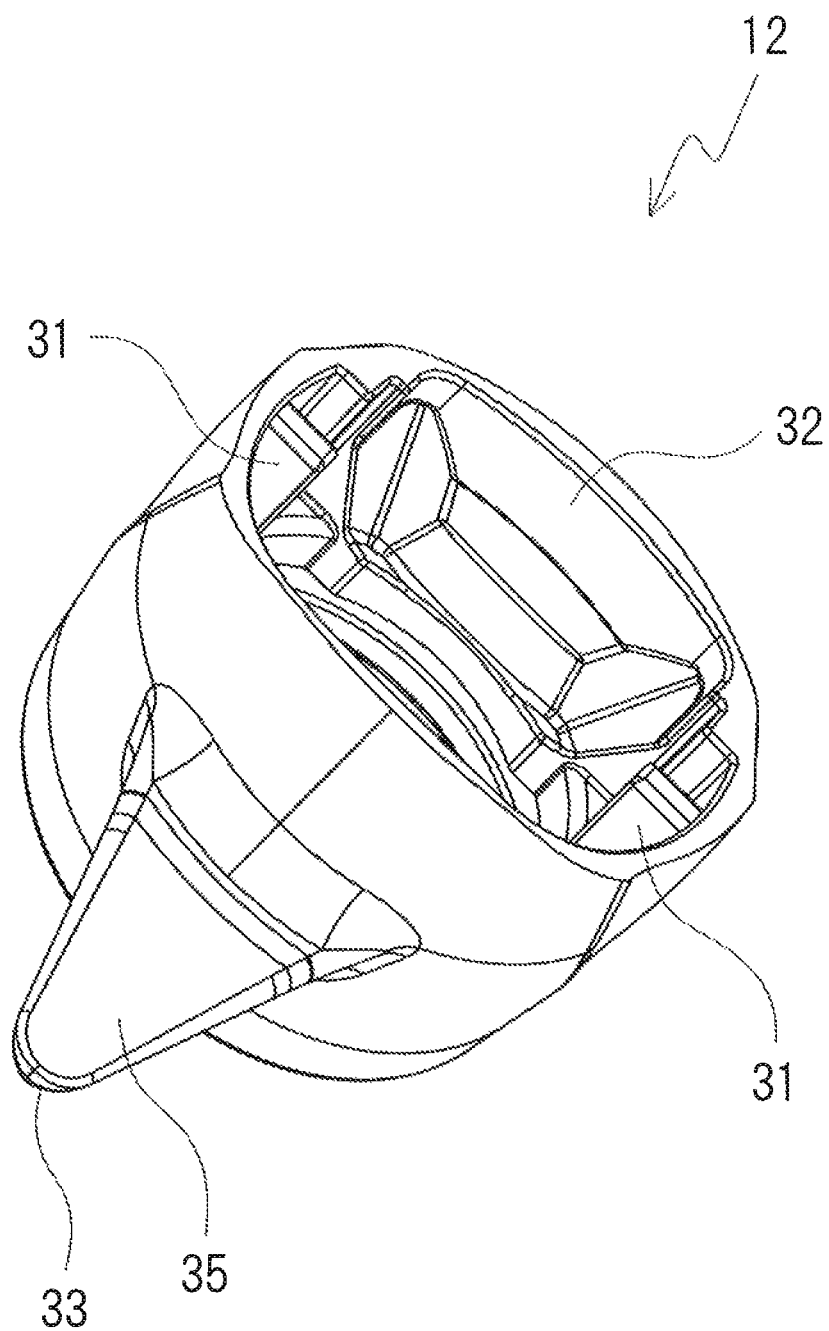
FIG. 15 is a perspective view of the movable hood as seen from the rear.

The angler gripping of fishing described above is only one example, and the particular angler grip can be selected by the angler. It is also possible to hold the fishing rod as shown in FIG. 13. Unlike the angler grip shown in FIG. 11, in the angler grip in FIG. 13 the index finger 102 is hooked on the trigger 33. The middle finger 103, the ring finger 104, and the little finger 105 can grip the grip 13. The handle 6 can be rotated with the middle finger 103. In this situation, it is possible to support the fishing rod at three points: the ball of the thumb 101, the index finger 102, and the little finger 105. It is also possible to easily stabilize the fishing rod by this three-point support.

An embodiment in which the dual-bearing reel 3 is attached to the reel seat 2 is described as an example, but a spinning reel may be attached as well. In the embodiment which includes the attachment of a spinning reel, the spinning reel is typically positioned on the lower side of the fishing rod, and the trigger 33 of the movable hood 12 is positioned on the upper side of the fishing rod.

Second Embodiment

Figure 16:
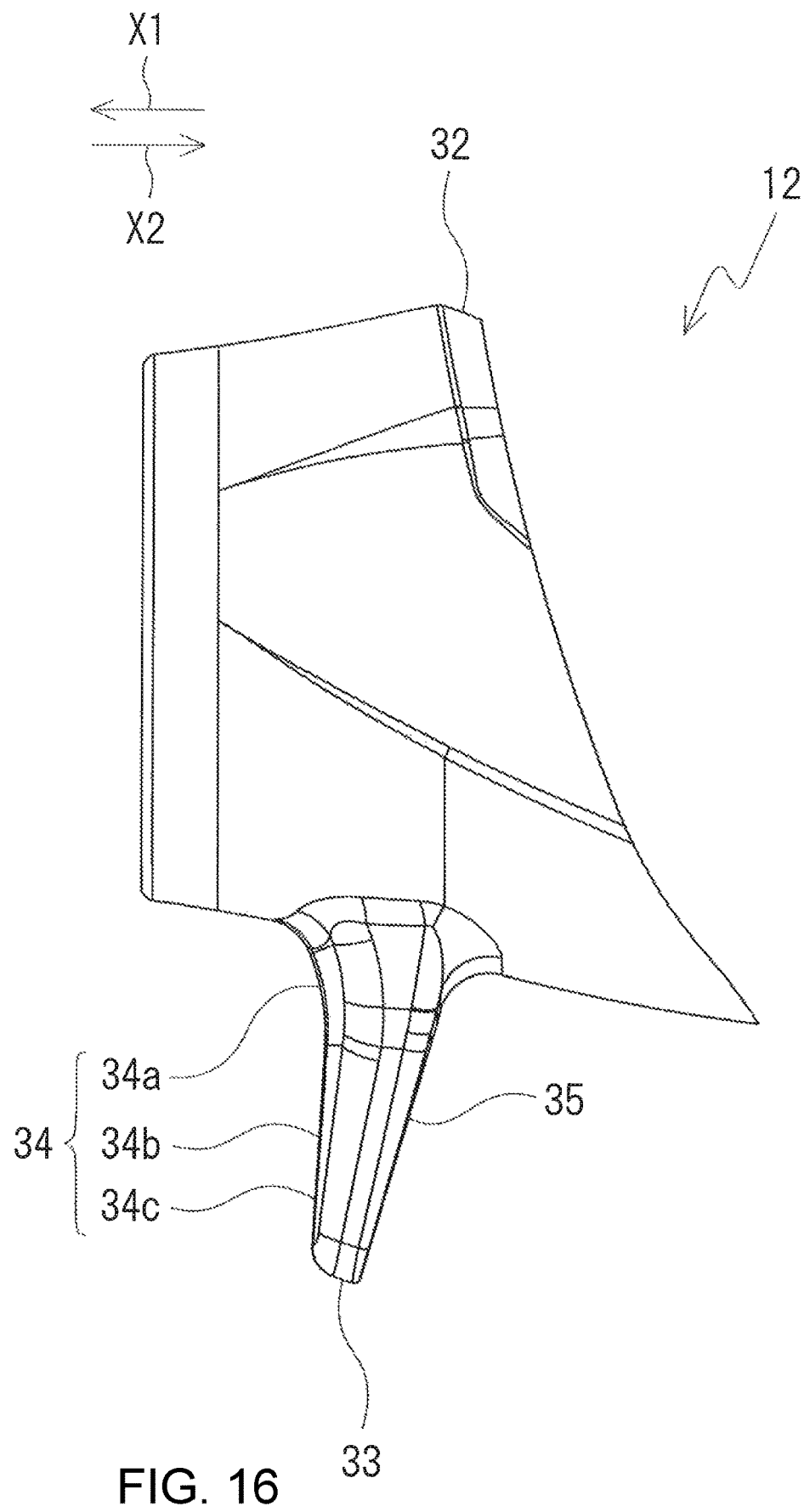
FIG. 16 is a left side view of the movable hood.
Figure 17:
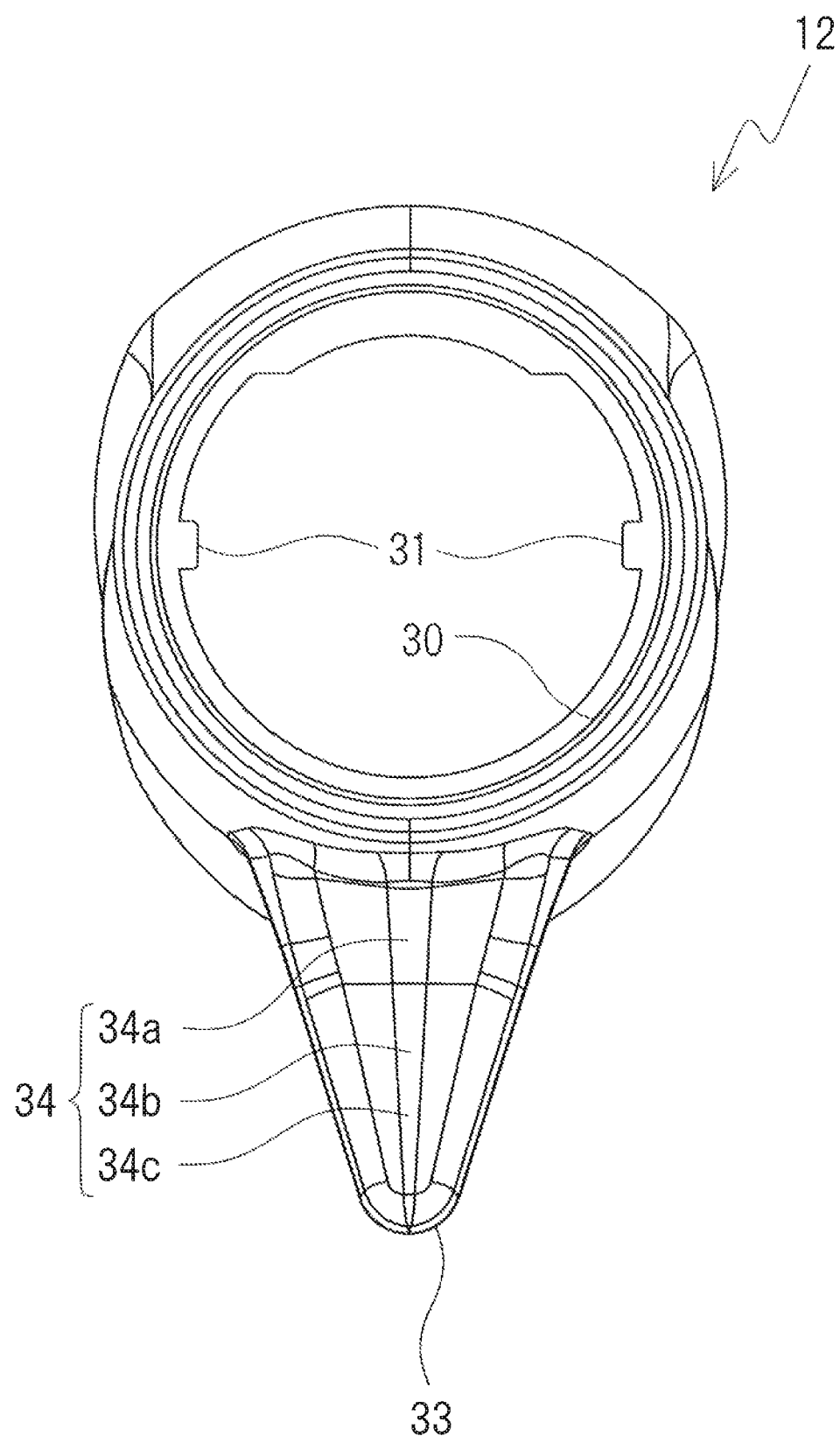
FIG. 17 is a front view of the movable hood as seen in the direction of the center line.
Figure 18:
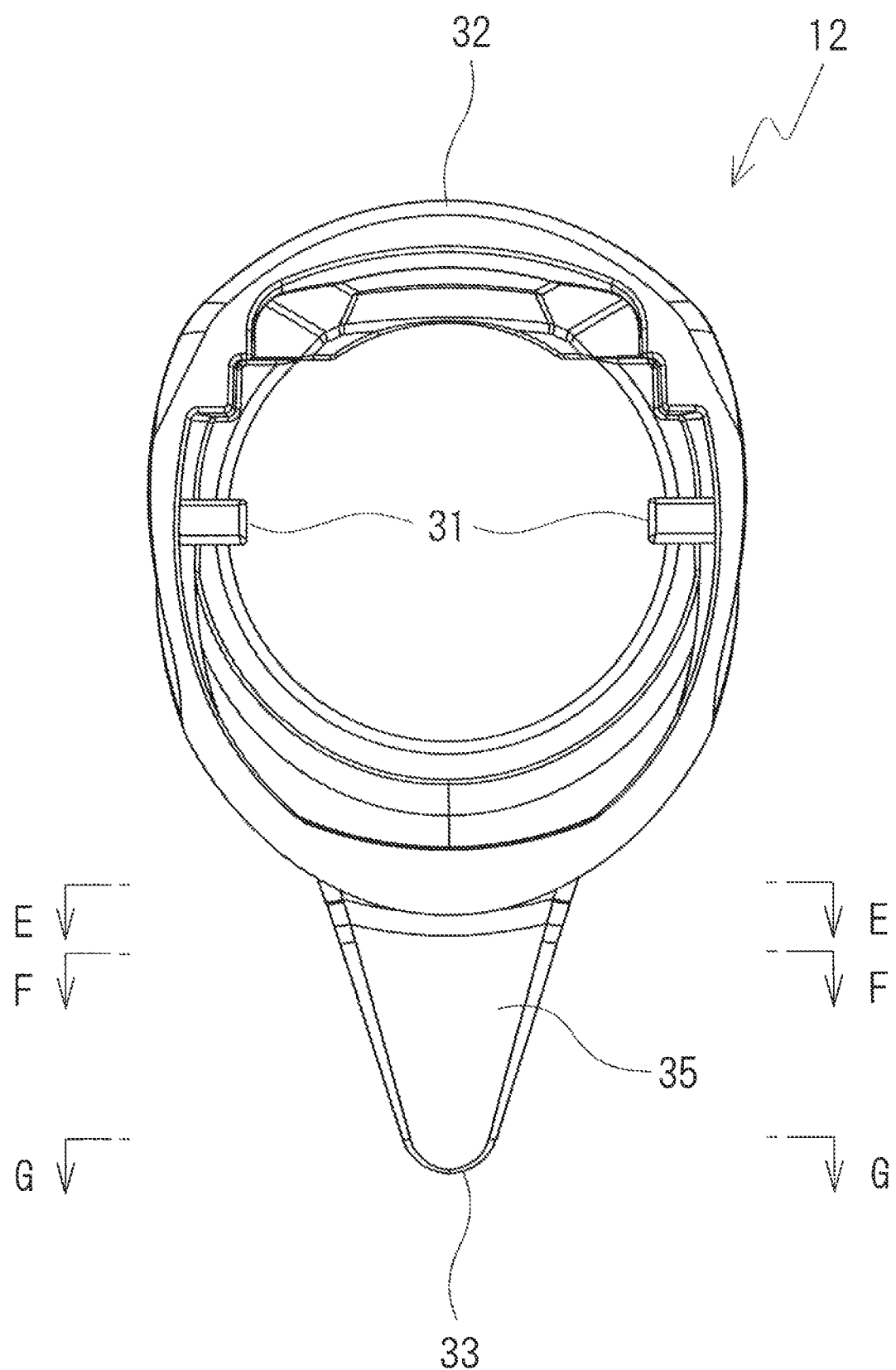
FIG. 18 is a rear view of the movable hood as seen in the direction of the center line.
Figure 19:
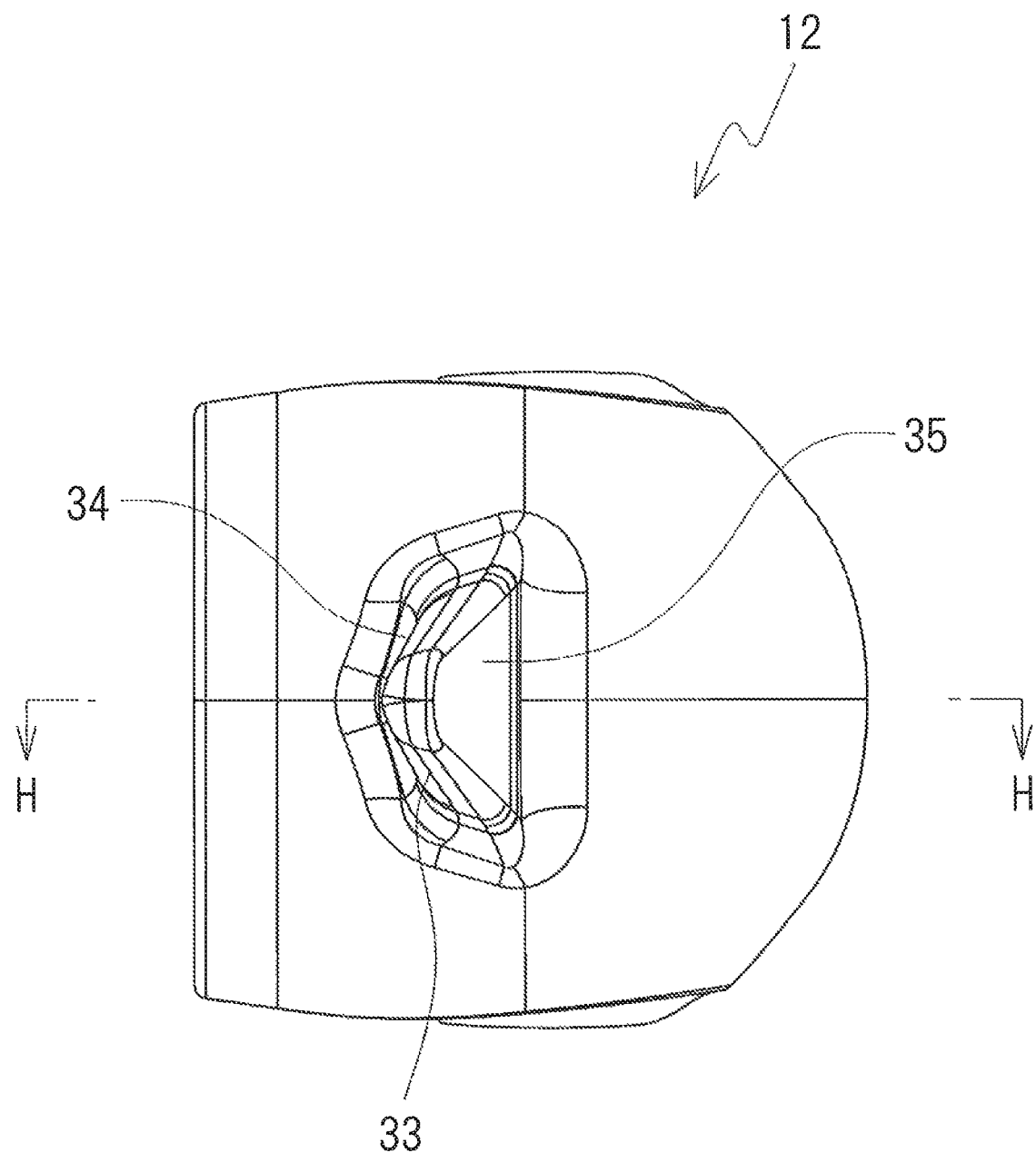
FIG. 19 is a bottom view of the movable hood as seen from the lower side.
Figure 20:
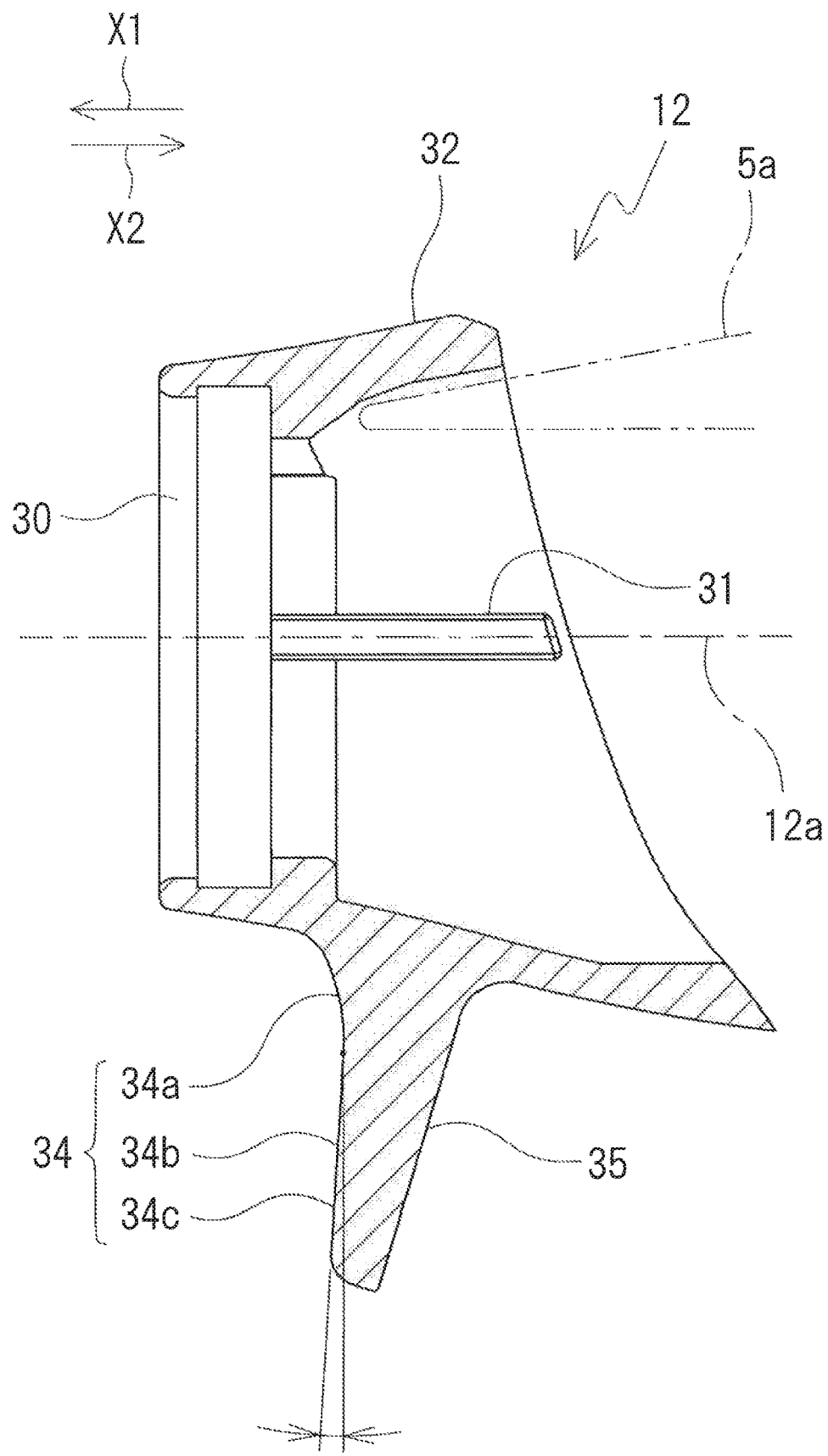
FIG. 20 is a cross-sectional view taken along line H-H in FIG. 19.
Figure 21A:
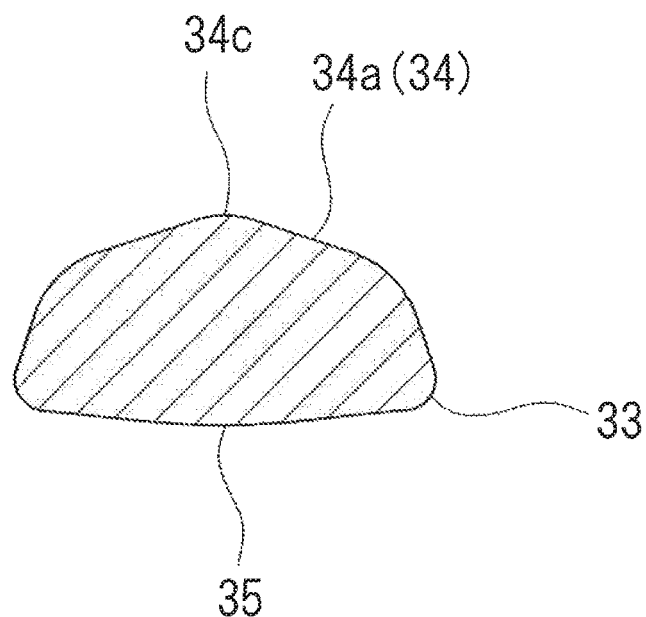
FIGS. 21A to 21C are cross-sectional views taken along lines E-E, F-F, and G-G of FIG. 18, respectively.
Figure 21B:
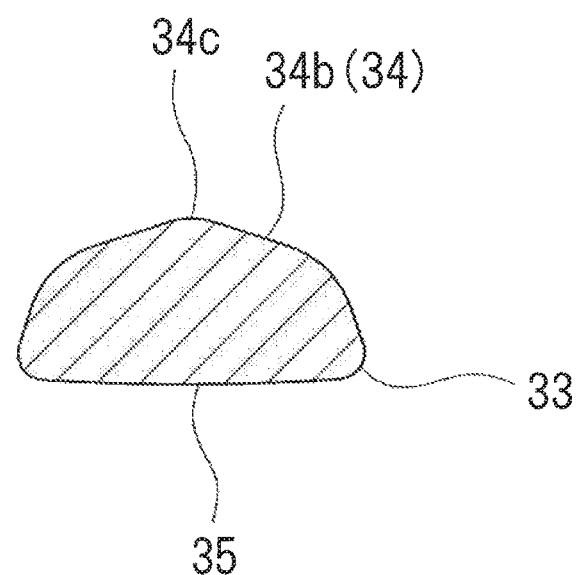
Figure 21C:
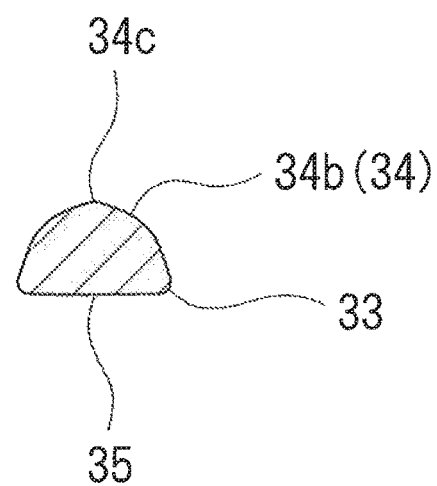

The movable hood 12, the reel seat 2, and the fishing rod according to a second embodiment will now be described. However, detailed descriptions of configurations that are the same as in the first embodiment will be omitted. The movable hood 12 according to the second embodiment is shown as a single unit in FIGS. 14 to 21C. The movable hood 12 according to the second embodiment has a pair of engagement ridges 31 on the left and right. In addition, in the movable hood 12 shown in FIGS. 16 and 20, the trigger 33 is positioned more forward compared with the movable hood 12 according to the first embodiment. The trigger 33 is positioned essentially in the central portion of the movable hood 12 in the longitudinal direction. A crest portion 34c, with a smaller radius of curvature than the other portions, extends along the longitudinal direction in the central portion of the front surface 34 of the trigger 33 in the left-right direction (central portion in the width direction). The crest portion 34c can be positioned at the first joint of a finger. The recess 36 described above is not disposed on the rear surface 35 of the trigger 33. As shown in FIGS. 21A-21C, the rear surface 35 of the trigger 33 projects slightly rearward in a horizontal sectional view, but the amount or degree of projection is less than the amount or degree of projection of the front surface 34 of the trigger 33. The rear surface 35 of the trigger 33 projects only slightly rearward. The rear surface 35 of the trigger 33 is slightly curved convexly rearward in the left-right direction, but the radius of curvature thereof is large and almost planar.

Figure 22:
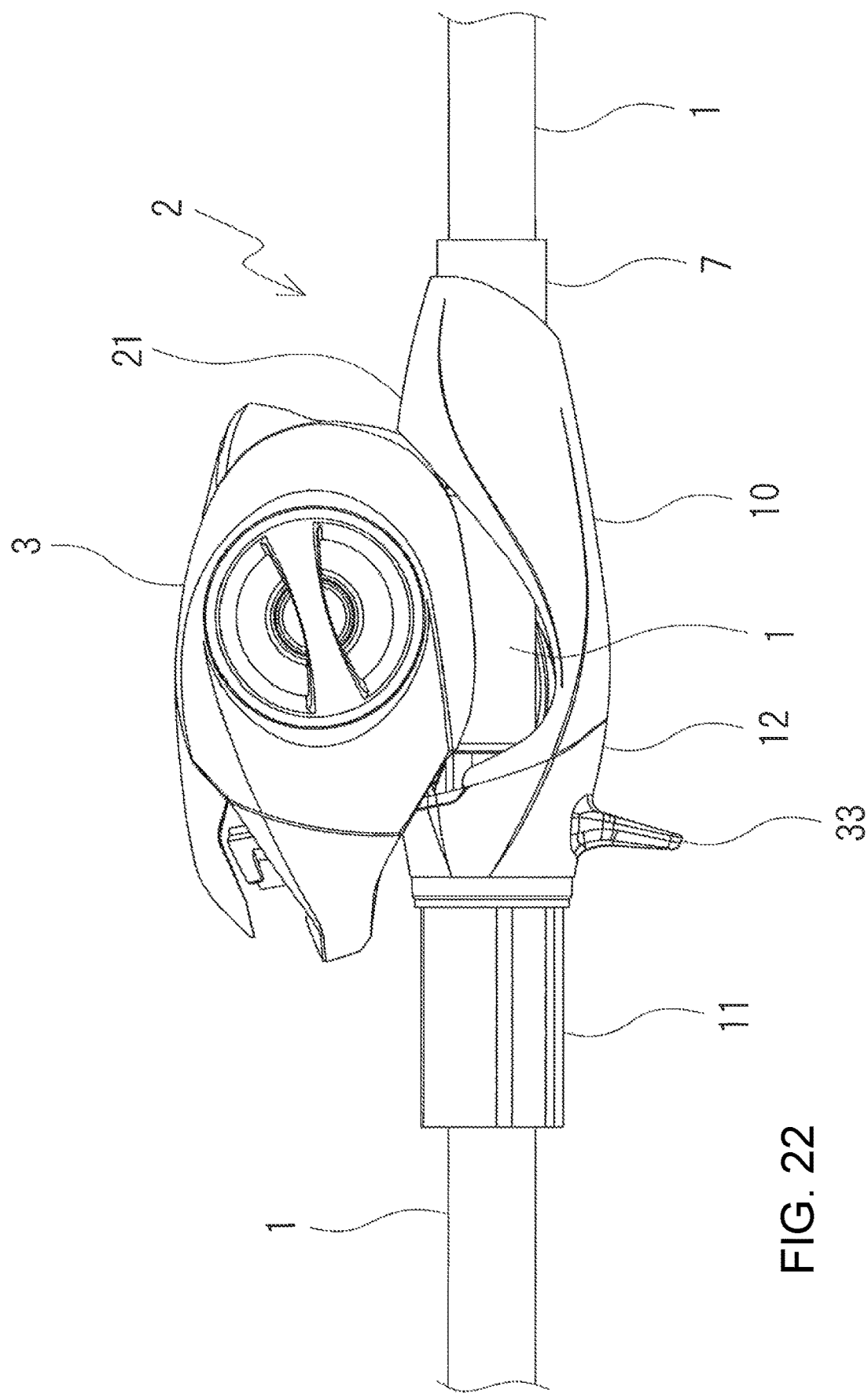
FIG. 22 is a left side view of a state in which a dual-bearing reel is attached to a fishing rod, on which is mounted a reel seat for a fishing rod comprising the movable hood.

FIG. 22 illustrates the dual-bearing reel 3 attached to the fishing rod. It is also preferable that, in some embodiments, a decorative cylindrical body 7 be disposed between the reel seat 2 and the rod body 1. The cylindrical body 7 may be made of metal, for example. In one embodiment, the dual-bearing reel 3 is a right-handle type. Thus, the fishing rod is held with the left hand. This reel seat 2 does not include the grip 13. Thus, in the case of a four-point support grip as described above, the ring finger 104 and the little finger 105 hold the reel seat body 10.

Figure 23:
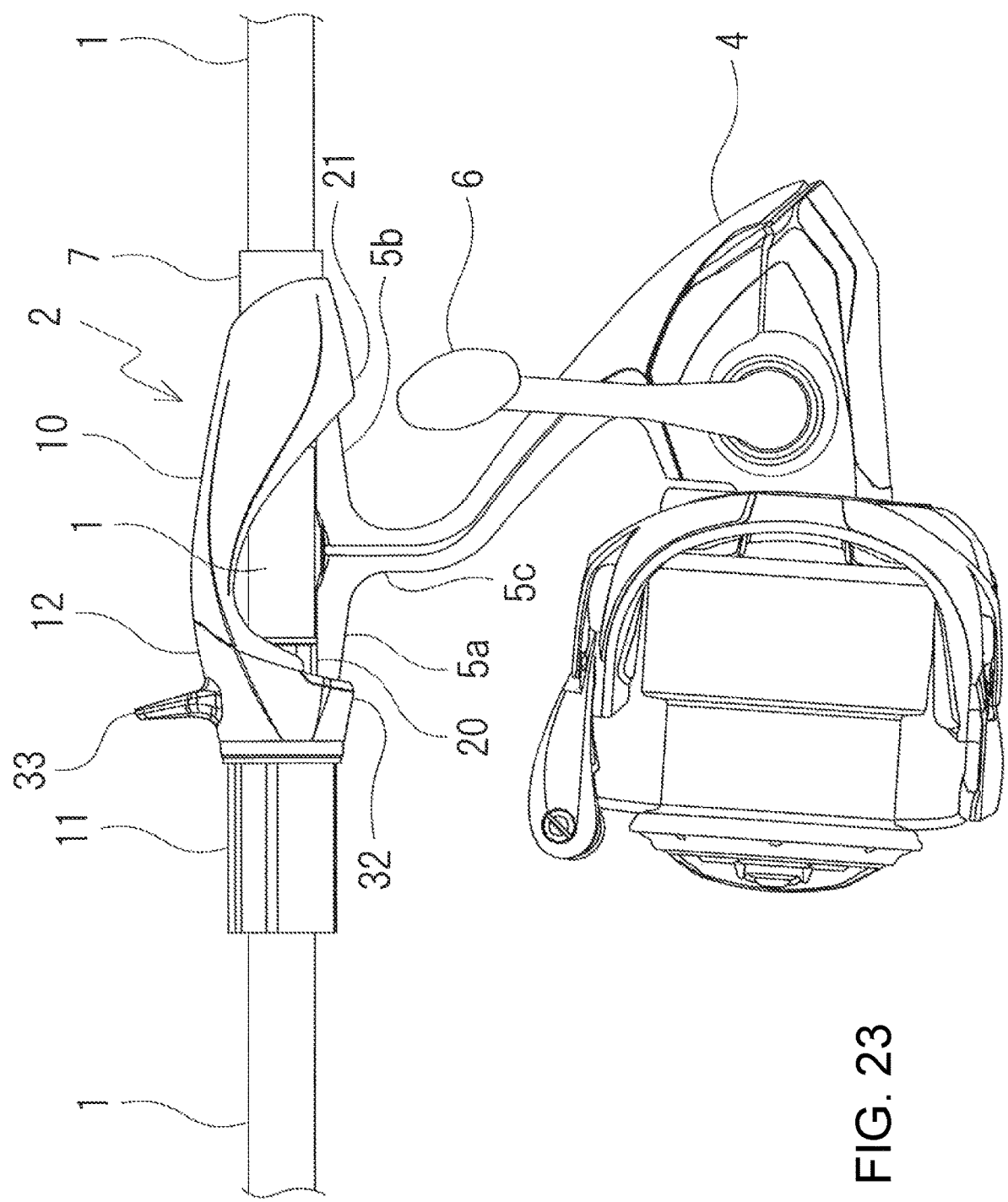
FIG. 23 is a left side view of a state in which a spinning reel is attached to a fishing rod, on which is mounted a reel seat for a fishing rod comprising the movable hood.

In addition, FIG. 23 illustrates a spinning reel 4 attached to the fishing rod. The spinning reel 4 can be a right-handle type or a left-handle type, but FIG. 23 illustrates the left-handle type. The fishing rod is held with the right hand. The reel seat 2 is upside down compared with the state shown in FIG. 22. The reel attachment portion 20 of the reel seat body 10, the hood portion 32 of the movable hood 12, and the fixed hood portion 21 of the reel seat body 10 are positioned on the lower side. The trigger 33 of the movable hood 12 is positioned on the upper side and projects upwards. The reel foot is attached to the reel foot attachment portion 20 of the reel seat body 10 from the lower side. The front-end portion 5a of the reel foot extends forward from an ankle portion 5c of the reel foot and is held by the hood portion 32 of the movable hood 12. A rear-end portion 5b of the reel foot extends rearward from the ankle portion 5c of the reel foot and is held by the fixed hood portion 21 of the reel seat body 10.

Figure 24:
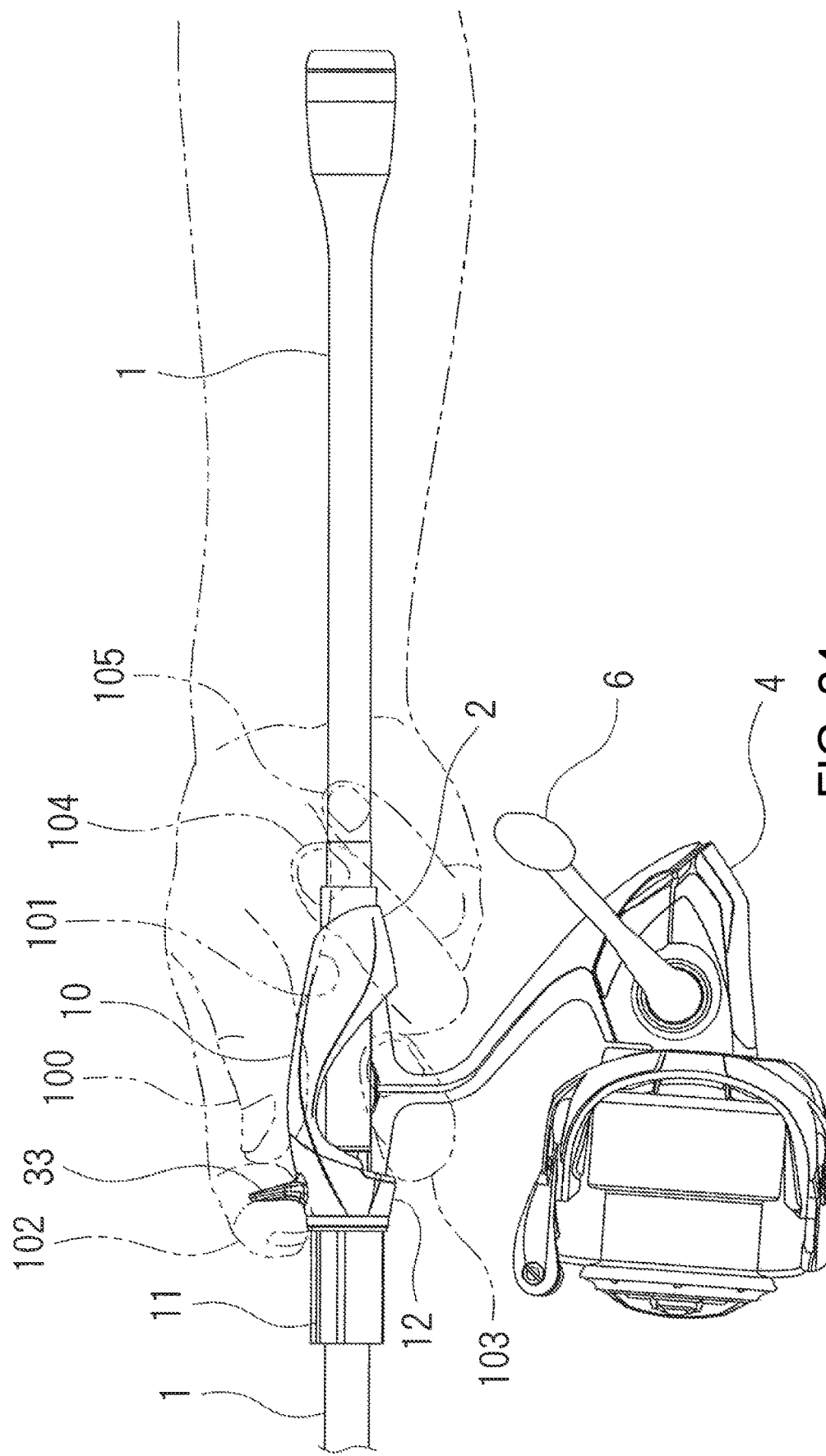
FIG. 24 is a side view showing one example of a state in which the fishing rod of FIG. 23 is gripped.

FIG. 24 shows one example of the grip. The thumb 100 is positioned on the upper side of the reel seat 2. The thumb 100 may make contact with the upper surface of the reel seat body 10 or may float slightly above the reel seat body 10. The ball of the thumb 101 contacts from the rear portion of the reel seat body 10 to the rod body 1. The ball of the thumb 101 is the first support point.

The index finger 102 can be hooked on the trigger 33. The index finger 102 thus becomes the second support point. The ankle portion 5c of the reel foot can be positioned between the middle finger 103 and the ring finger 104. The middle finger 103 can be positioned on the front side of the ankle portion 5c of the reel foot. The middle finger 103 can contact the ankle portion 5c of the reel foot from the front side; in that situation, the middle finger 103 is the third support point. The ring finger 104 and the little finger 105 can be positioned on the rear side of the ankle portion 5c of the reel foot. The ring finger 104 can positioned rearward, away from the ankle portion 5c of the reel foot. The little finger 105 thus becomes the fourth support point. In this manner, it is possible to support the fishing rod at four points: the ball of the thumb 101, the index finger 102, the middle finger 103, and the little finger 105. With this grip, bending of the wrist can be reduced or eliminated, and the fishing rod can be held more naturally.

Other Embodiments

Figure 25:
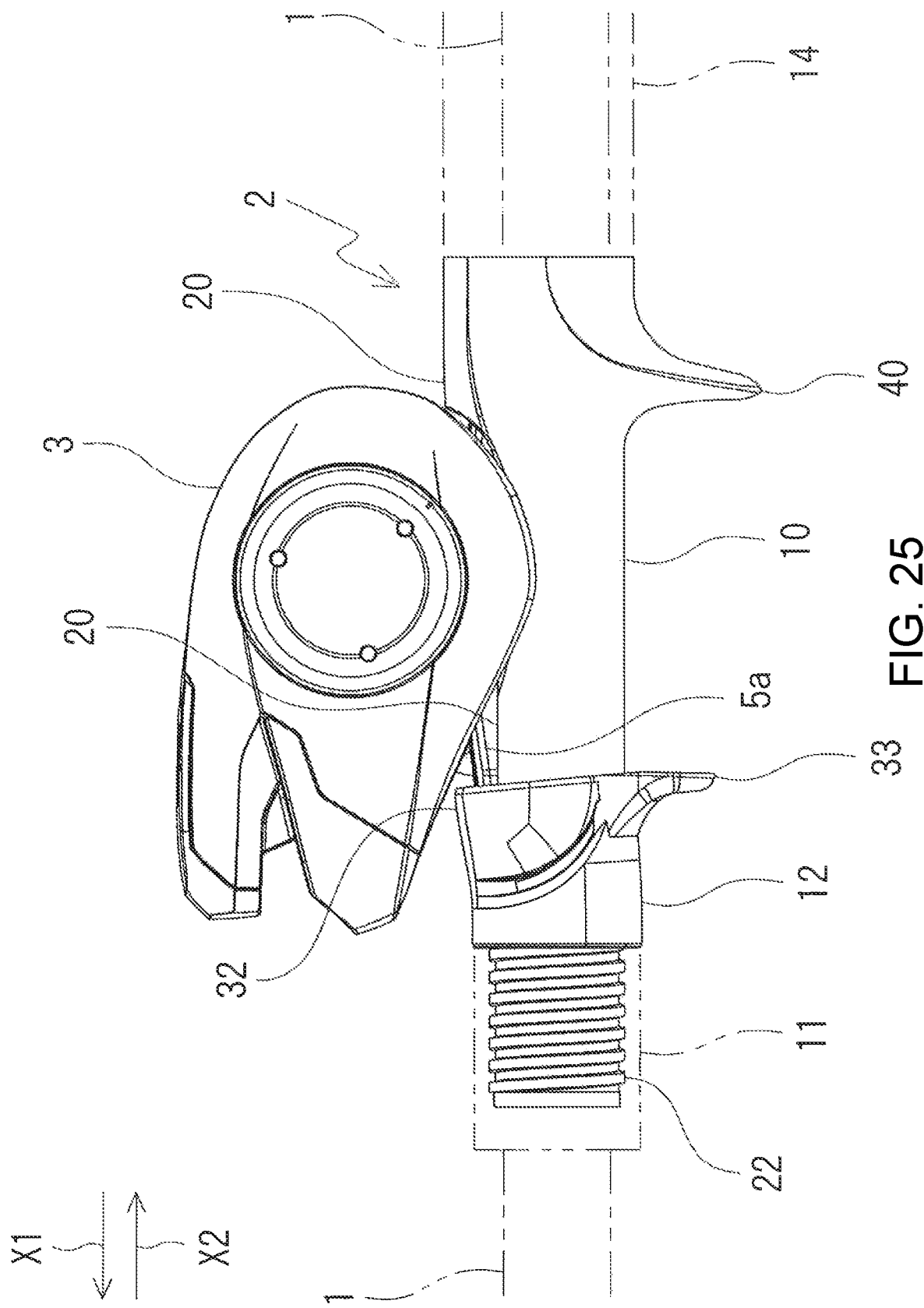
FIG. 25 is a left side view of a state of using the fishing rod, on which is mounted the reel seat according to another embodiment of the present invention.

Some representative examples of other variants of the reel seat 2 will be described. As shown in FIG. 25, the reel seat body 10 may have a second trigger 40. The second trigger 40 is integrally formed on the lower surface of the reel seat body 10. The second trigger 40 is positioned, for example, at a rear portion of the lower surface of the reel seat body 10. The second trigger 40 of the reel seat body 10 is positioned rearward, away from the trigger 33 of the movable hood 12. The second trigger 40 of the reel seat body 10 has a greater projecting length than the trigger 33 of the movable hood 12 and extends farther downward than the trigger 33 of the movable hood 12. The dual-bearing reel 3 is mainly attached to this reel seat 2. A tubular grip 14 can be disposed at a position on the rear side of the reel seat 2. The grip 14 is mounted on the rod body 1. casein the embodiments of the four-point support grip described above, the little finger 105 can abut the second trigger 40 of the reel seat body 10 from the front side. In the embodiments of a three-point support described above, the second trigger 40 of the reel seat body 10 can also be positioned between the ring finger 104 and the little finger 105. It is also readily possible to accommodate a grip in which a finger is not hooked on the movable hood 12; for example, it is possible to sandwich the second trigger 40 of the reel seat body 10 between the index finger 102 and the middle finger 103.

Figure 26:
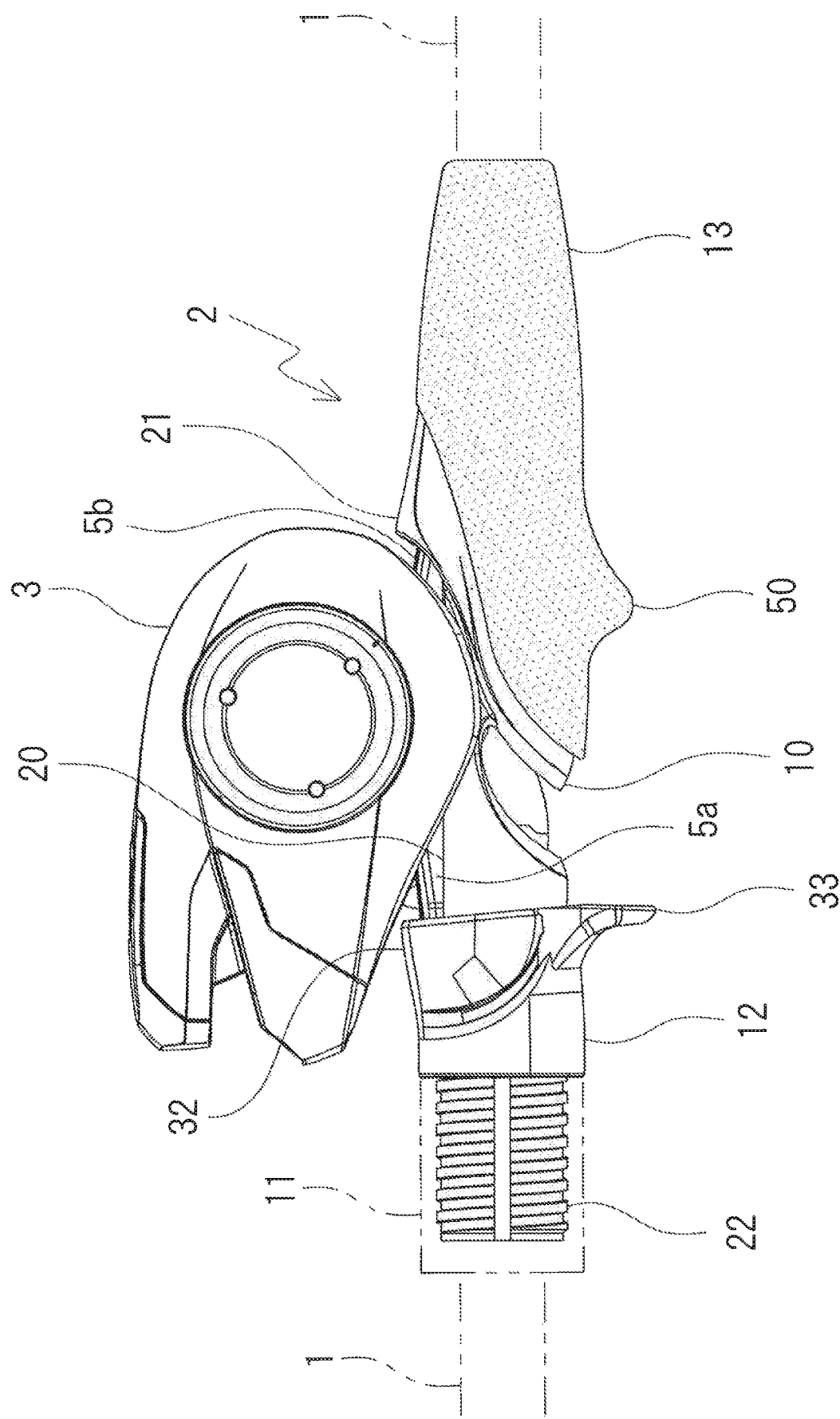
FIG. 26 is a left side view of the state of using the fishing rod, on which is mounted the reel seat according to another embodiment of the present invention.

The reel seat 2 shown in FIG. 26 can include the grip 13 in the same manner as the reel seat 2 of the first embodiment. A projection 50 can be formed on the lower surface of the grip 13. In this embodiment, the projection 50 has a shorter downward projecting length than, for example, the second trigger 40 of FIG. 25. The projection 50 can have a shorter projecting length than the trigger 33 of the movable hood 12. This projection 50 can be positioned, for example, between the ring finger 104 and the little finger 105.

Figure 27:
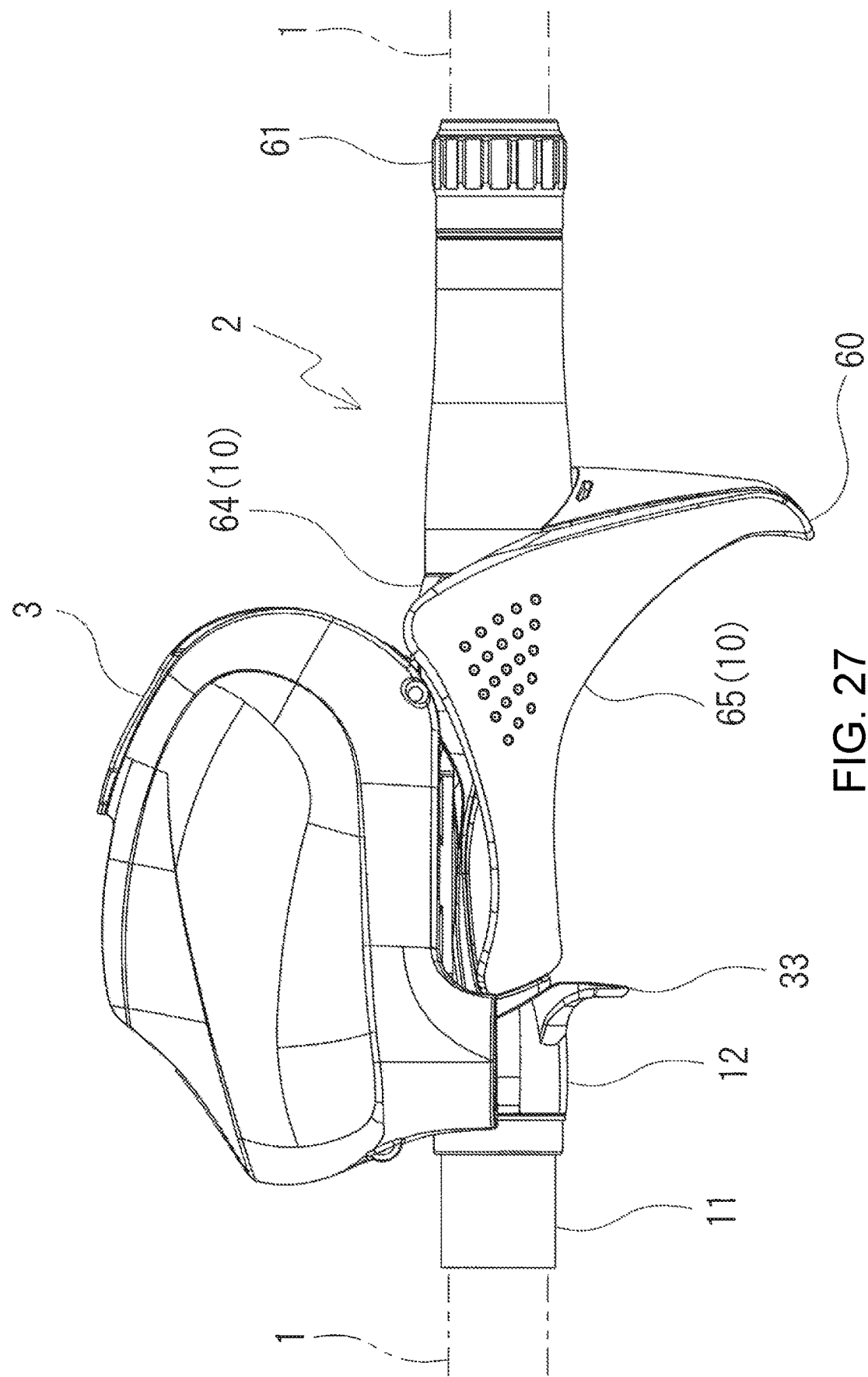
FIG. 27 is a left side view of a state of using the fishing rod, on which is mounted the reel seat according to another embodiment of the present invention.
Figure 28:
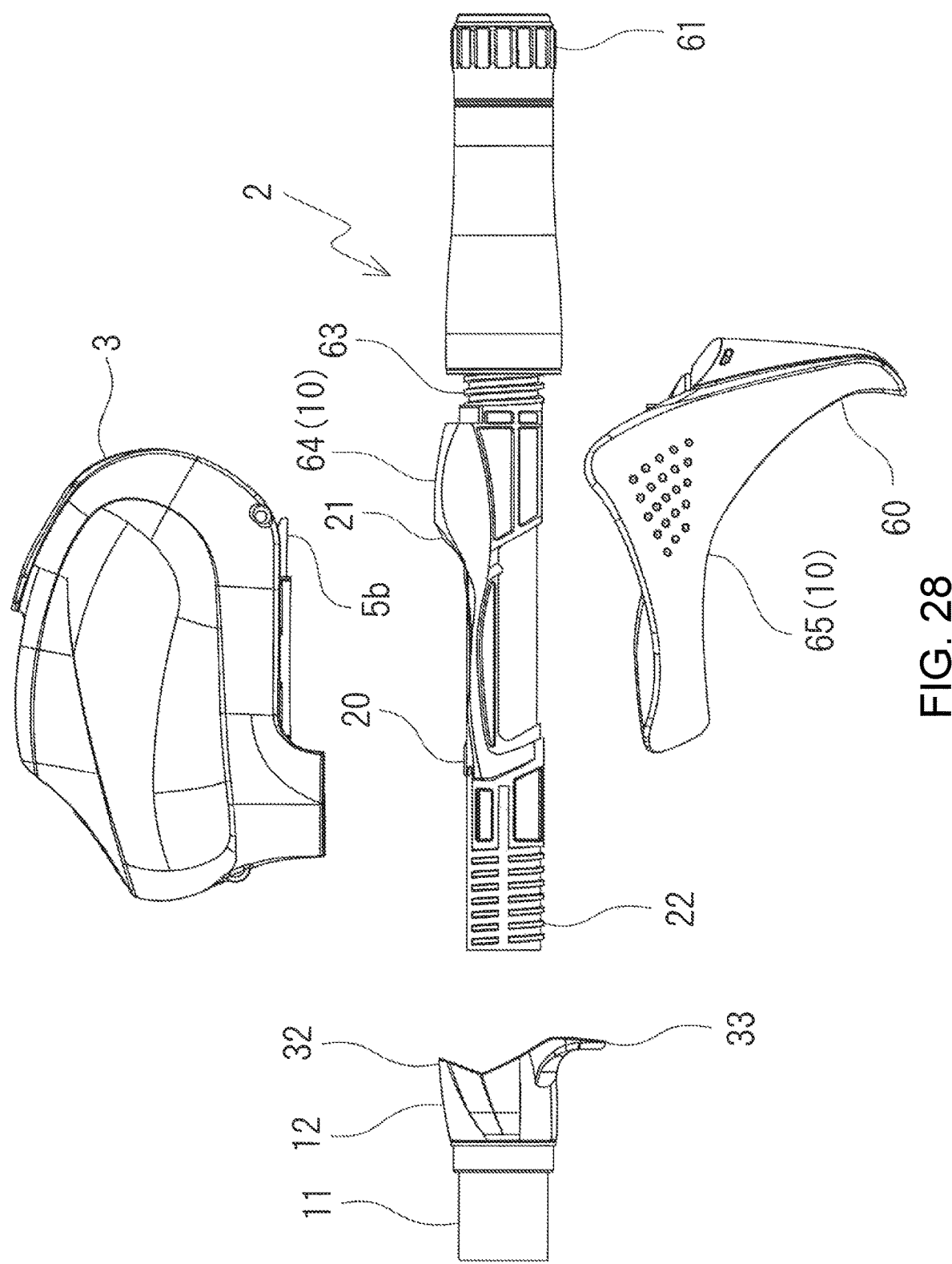
FIG. 28 is an exploded view of the reel seat.

The reel seat 2 shown in FIGS. 27 and 28 include a palming grip portion 60 that projects basically downward. The reel seat 2 comprises the reel seat body 10, the movable hood 12, the nut 11 for the movable hood 12, and a holding nut 61. The reel seat body 10 includes the reel foot attachment portion 20, the fixed hood portion 21, the male threaded portion 22 for the movable hood 12, the palming grip portion 60, and a holding male threaded portion 63. The holding male threaded portion 63 is positioned rearward of the fixed hood portion 21. The holding nut 61 can be threaded onto the holding male threaded portion 63.

The reel seat body 10 can include a fixing member 64 and a replacement member 65, which are formed as separate bodies. The fixing member 64 can be the main part of the reel seat body 10 and has an overall tubular shape. The fixing member 64 can be fixed to the rod body 1. The fixing member 64 includes a reel foot attachment portion 62, the fixed hood portion 21, the male threaded portion 22 for the hood, and the holding male threaded portion 63. The replacement member 65 can be attached to/detached from the fixing member 64. The replacement member 65 can be separated from the fixing member 64 in the downward direction, and can be attached to the fixing member 64 in the upward direction from the lower side. The replacement member 65 has the palming grip portion 60. The replacement member 65 can be attached to/detached from the fixing member 64 when the holding nut 61 is loosened and retracted backward. By rotating the holding nut 61 forward, the holding nut 61 pushes the replacement member 65 forward. The replacement member 65 is sandwiched between and fixed in the longitudinal direction by the fixing member 64 and the holding nut 61.

What is claimed is:

1. A tubular reel seat for a fishing rod, including a reel attachment portion and a tubular movable hood disposed on a front side of the reel seat,
    the tubular movable hood comprising:
        a hood portion configured to cover a front-end portion of a reel foot of a fishing reel, the hood portion including an opening edge portion at a rear-end opening of the movable hood, and only an upper part of a circumference of the opening edge portion projecting radially outwardly; and
        a trigger disposed in part of a circumference of an outer circumferential surface of the movable hood on an opposite side of the hood portion, the movable hood configured to be positioned on the rod such that the trigger is disposed in front of a center line of the reel attachment portion, and the trigger configured to be hooked by a finger from the front side.

2. The reel seat for fishing rod according to claim 1, wherein
    a front surface of the trigger is convexly curved forward along a width direction, and a rear surface of the trigger includes a recess.

3. The reel seat for the fishing rod according to claim 1, wherein
    a front surface of the trigger is convexly curved forward along a width direction, and an amount a rear surface of the trigger projects in a rearward direction being less than an amount the front surface projected in a forward direction in a horizontal sectional view.

4. The reel seat for the fishing rod according to claim 1, wherein
    the trigger projects in a length that generally corresponds to a width of one finger.

5. The reel seat for the fishing rod according to claim 1, wherein
    a distal end side region of a front surface of the trigger is inclined forward with respect to a radial direction of the movable hood at an angle of inclination of 10 degrees or less, and, when a reel is attached, the distal end side region of the front surface of the trigger extends in a radial direction of the movable hood or is inclined forward with respect to the radial direction of the movable hood.

6. The fishing rod comprising:
    the reel seat for fishing rod according to claim 1.

7. A tubular movable hood of a reel seat for a fishing rod, comprising:
    a hood portion configured to cover a front-end portion of a reel foot, the hood portion including an opening edge portion at a rear-end opening of the movable hood, and only an upper part of a circumference of the opening edge portion projecting radially outwardly, wherein the rear-end opening of the movable hood is configured to face a rod butt side of the fishing rod during operation; and
    a trigger disposed, in part of an entire circumference of an outer circumferential surface of the movable hood on a side opposite to the hood portion, the trigger configured to hook a finger from a front side.

8. The reel seat for the fishing rod according to claim 1, wherein
    the trigger and the upper part of the circumference of the opening edge portion are symmetrically disposed with respect to a longitudinal direction of the fishing rod.

* * * * *